US008369568B2

(12) United States Patent
Agaian et al.

(10) Patent No.: US 8,369,568 B2
(45) Date of Patent: Feb. 5, 2013

(54) METHODS AND SYSTEMS FOR DIGITAL IMAGE SECURITY

(75) Inventors: Sos S. Agaian, San Antonio, TX (US); David Akopian, San Antonio, TX (US); Ravindranath C. Cherukuri, San Antonio, TX (US); Juan Pablo Perez, North Las Vegas, NV (US); Benjamin M. Rodriguez, Beavercreek, OH (US); Ronnie R. Sifuentes, Jr., San Antonio, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 0 days.

(21) Appl. No.: 13/134,062

(22) Filed: May 27, 2011

(65) Prior Publication Data

US 2011/0228973 A1 Sep. 22, 2011

Related U.S. Application Data

(62) Division of application No. 11/740,742, filed on Apr. 26, 2007, now Pat. No. 7,965,861.

(60) Provisional application No. 60/745,729, filed on Apr. 26, 2006.

(51) Int. Cl.
*G06K 9/00* (2006.01)
(52) U.S. Cl. .......................................... 382/100
(58) Field of Classification Search .................. 382/100; 713/176
See application file for complete search history.

(56) References Cited

U.S. PATENT DOCUMENTS

| 6,785,814 | B1 * | 8/2004 | Usami et al. | 713/176 |
|---|---|---|---|---|
| 7,333,244 | B2 * | 2/2008 | Stanich et al. | 358/3.28 |
| 7,639,833 | B2 * | 12/2009 | LeComte et al. | 382/100 |
| 2007/0033419 | A1 | 2/2007 | Kocher et al. | 713/193 |

OTHER PUBLICATIONS

Abdat and Bellanger, "Combining gray coding and JBIG for lossless image compression," *Proceedings of IEEE International Conference on Image Processing*, 3:851-855, 1994.
Agaian and Cai, "New multilevel DCT, feature vectors, and universal blind steganalysis," *Security, Steganography, and Watermarking of Multimedia Contents VII*, 5681:653-663, 2005.
Agaian and Cherukuri, "Secure and robust steganographic algorithm for binary images," *Proceedings of Society of Photo-optical Instrumentation Engineers, the International Society for Optical Engineering*, 6235:F1-F10, 2006.
Chen et al., "A new data hiding method in binary image," *Proceedings of the IEEE Fifth International Symposium on Multimedia Software Engineering*, 88-93, 2003.
Cheng et al., "Steganalysis of binary text images," *Proceedings on IEEE International Conference on Acoustics, Speech, and Signal Processing*, 4:689-692, 2005.
Cohn and Lempel, "On fast m-sequence transforms," *IEEE Transactions on Information Theory*, 23:135-137, 1977.

(Continued)

*Primary Examiner* — Claire X Wang
(74) *Attorney, Agent, or Firm* — Fulbright & Jaworski L.L.P.

(57) ABSTRACT

Methods and systems for securing digital imagery are provided. In one respect, embedding, compression, encryption, data hiding, and other imaging processing techniques and systems may be provided for digital image security. In one non-limiting example, a method for producing a compressed and encrypted image is provided. An image may be converted into a binary bit stream, and the bit stream may be decomposed into a plurality of segments. A binary sequence based on a first key may be generated and may be used to generate a code matrix. A distance between the code matrix and the distance may be determined for each of the plurality of segments. Using a combined first and second key, a compressed and encrypted image may be obtained.

21 Claims, 32 Drawing Sheets
(23 of 32 Drawing Sheet(s) Filed in Color)

OTHER PUBLICATIONS

Crandall, "Some notes on steganography," posted on http://os.inf.tu-dresden.de/~westfeld/crandall.pdf, *Steganography Mailing List*, 1998.

Dumitrescu and Wu, "Steganalysis of LSB embedding in multimedia signals," *Proceedings of IEEE International Conference on Multimedia Expo*, 1:581-584, 2002.

Fridrich et al., "Lossless data embedding for all image formats," *Proceedings of SPIE Photonics West, Security and Watermarking of Multimedia Contents*, 4675:572-583, 2002.

Fridrich et al., "Writing on wet paper," *IEEE Transactions on Signal Processing*, 53(10):3923-3935, 2005.

Hill and Ridley, "Blind estimation of direct-sequence spread spectrum m-sequence chip codes," *IEEE on $6^{th}$ Int. Symp. on Spread-Spectrum Tech. & Appli.*, 1:305-309, 2000.

Huffman, "A method for the construction of minimum-redundancy codes," *Proceedings of the I.R.E.*, 40(9):1098-1101, 1952.

Hwang and Chang, "A run-length mechanism for hiding data into binary images," *Proceedings of Pacific Rim Workshop on Digital Steganography*, 71-74, 2002.

Kawaguchi and Eason, "Principle and applications of BPCS-steganography," *International Symposium on Voice, Video, and Data Communications*, 1998.

Kuroki et al., "Adaptive arithmetic coding for image prediction errors," *Proceedings of the International Symposium on Circuits and Systems*, 3:961-964, 2004.

Lee and Chen, "High capacity image steganographic model," *IEE Proc.—Vis. Image Signal Process.*, 147(3):288-294, 2000.

Lin, "'Shift and add' property of m-sequences and its application to channel characterisation of digital magnetic recording," *IEE Proceedings—Communications*, 142(3):135-140, 1995.

Lötter and Linde, "A comparison of three families of spreading sequences for CDMA applications," *Proceedings of the 1994 IEEE South African Symposium on Communications and Signal Processing*, 68-75, 1994.

Lu et al., "An objective distortion measure for binary document images based on human visual perception," *Proceedings on 16th International Conference on Pattern Recognition*, 4:239-242, 2002.

Neeta and Snehal, "Implementation of LSB steganography and its evaluation for various bits," *First International Conference on Digital Information Management*, 173-178, 2006.

Niimi et al., "Luminance quasi-preserving color quantization for digital steganography to palette-based images," *Proceedings of the 16th International Conference on Pattern Recognition*, 1:251-254, 2002.

Notice of Allowance issued in U.S. Appl. No. 11/740,742, mailed Feb. 7, 2011.

Office Action issued in U.S. Appl. No. 11/740,742, mailed Oct. 20, 2010.

Provos and Honeyman, "Hide and seek: An introduction to steganography," *IEEE Security & Privacy*, 1(3):32-44, 2003.

Sharp, "An implementation of key-based digital signal steganography," *Information Hiding*, 2137:13-26, 2001.

Sutter, "The fast m-Transform: A fast computation of cross-correlations with binary m-Sequences," *SIAM J. Comput.*, 20(4):686-694, 1991.

Swanson et al., "Multimedia data-embedding and watermarking technologies," *Proceedings of the IEEE*, 86(6):1064-1087, 1998.

Tirkel et al., "Image watermarking," *IEEE International Symposium on Spread Spectrum Techniques and Applications*, Mainz Germany, 785-789, 1996.

Tsai et al., "Data hiding of binary images using pair-wise logical computation mechanism," *IEEE International Conference on Multimedia and Expo*, 2:951-954, 2004.

Tseng and Pan, "Data hiding in 2-color images," *IEEE Transactions on Computers*, 51(7):873-878, 2002.

Tseng and Pan, "Secure and invisible data hiding in 2-color images," *Proceedings of Twentieth Annual Joint Conference of the IEEE Computer and Communications Societies*, 2:887-896, 2001.

Tseng et al., "A secure data hiding scheme for binary images," *IEEE Transactions on Communications*, 50(8):1227-1231, 2002.

Valova and Kosugi, "Hadamard-based image decomposition and compression," *IEEE Transactions on Information Technology in Biomedicine*, 4(4):306-319, 2000.

Wu and Liu, "Data hiding in binary image for authentication and annotation," *IEEE Transactions on Multimedia*, 6(4):528-538, 2004.

Wu and Tsai, "Spatial-domain image hiding using image differencing," *IEE Proc. Vis. Image Signal Process.*, 147(1):29-37, 2000.

Wu et al., "Handling uneven embedding capacity in binary images," *Security, Steganography, and Watermarking of Multimedia Contents VII*, 5681:194-205, 2005.

Yang and Kot, "Data hiding for bi-level documents using smoothing technique," *Proceedings of the 2004 International Symposium on Circuits and Systems*, 5:692-695, 2004.

Zhi and Fen, "Detection of random LSB image steganography," *IEEE $60^{th}$ Vehicular Technology Conference*, 3:2113-2117, 2004.

Zongqing and Hongbin, "A new data hiding method in binary images," *Proceedings of the First International Conference on Innovative Computing, Information and Control*, 3:66-69, 2006.

* cited by examiner

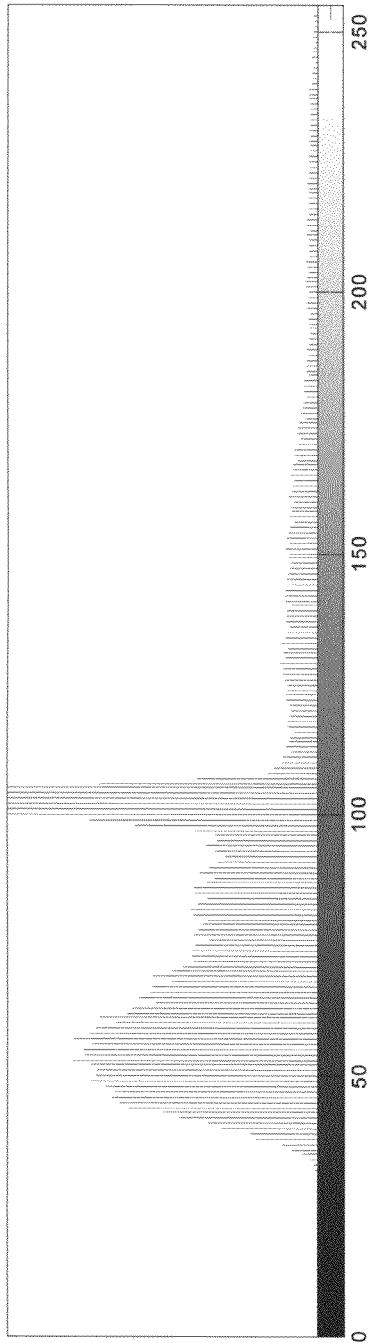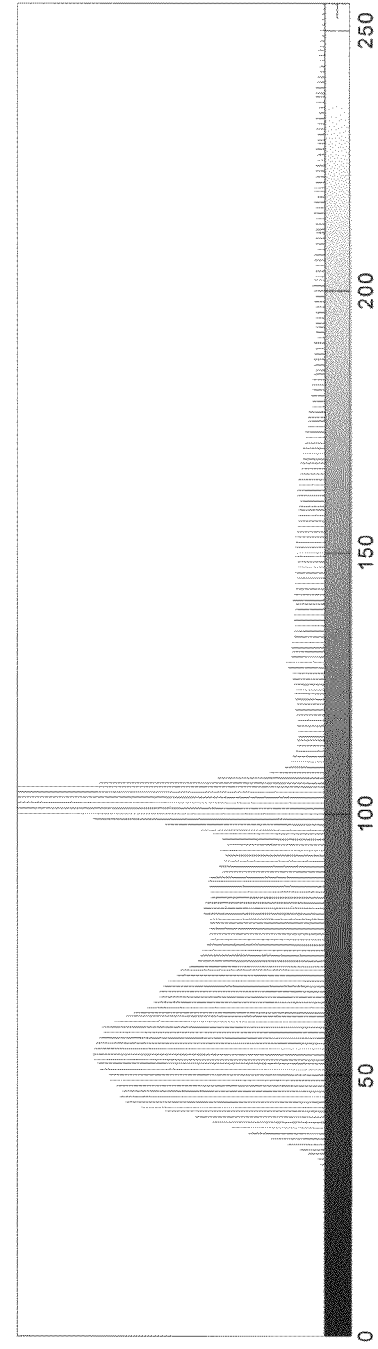
FIG. 12A
FIG. 12B

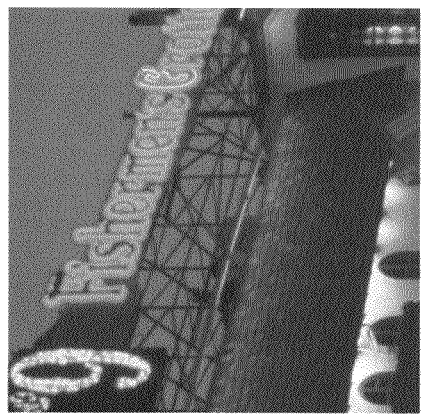
FIG. 15G
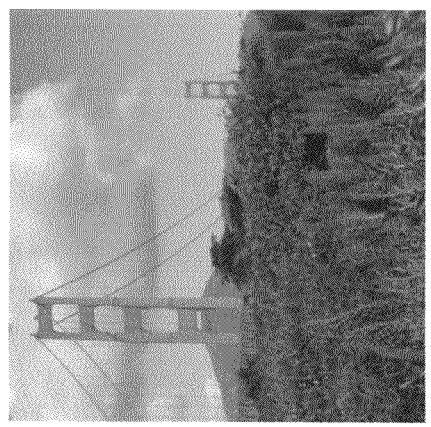
FIG. 15F
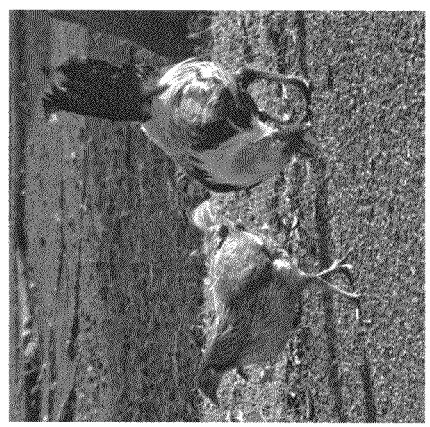
FIG. 15E
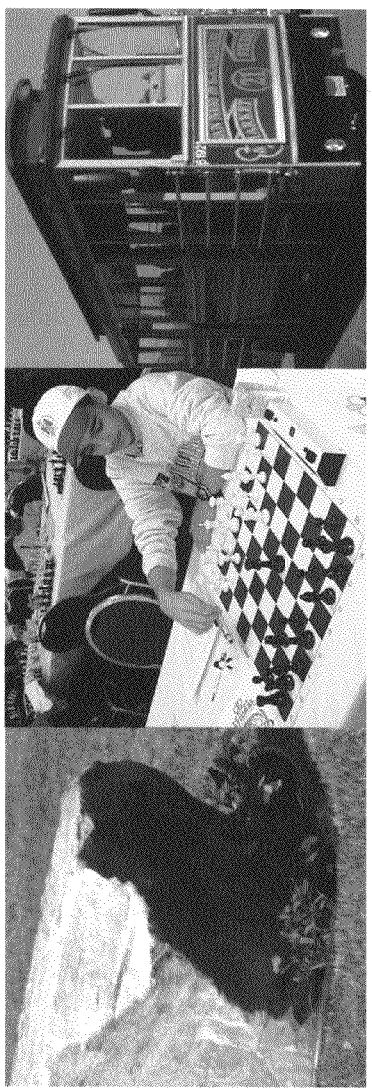
FIG. 15J
FIG. 15I
FIG. 15H

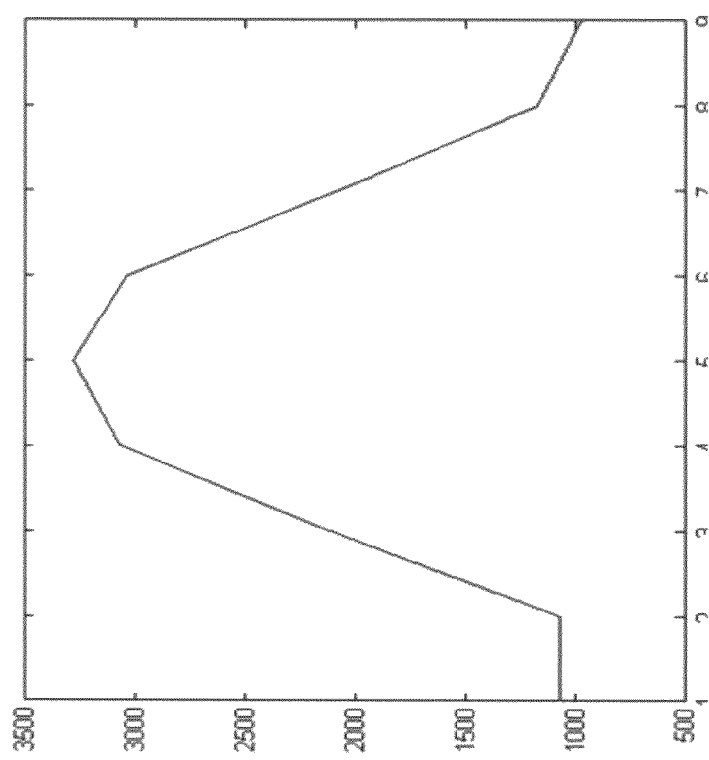
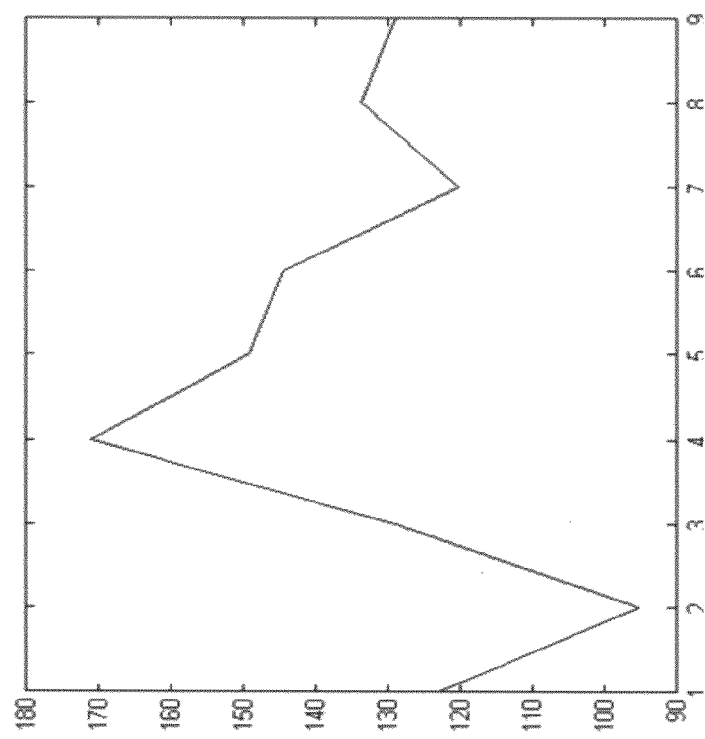
FIG. 16A
FIG. 16B

FIG. 23A
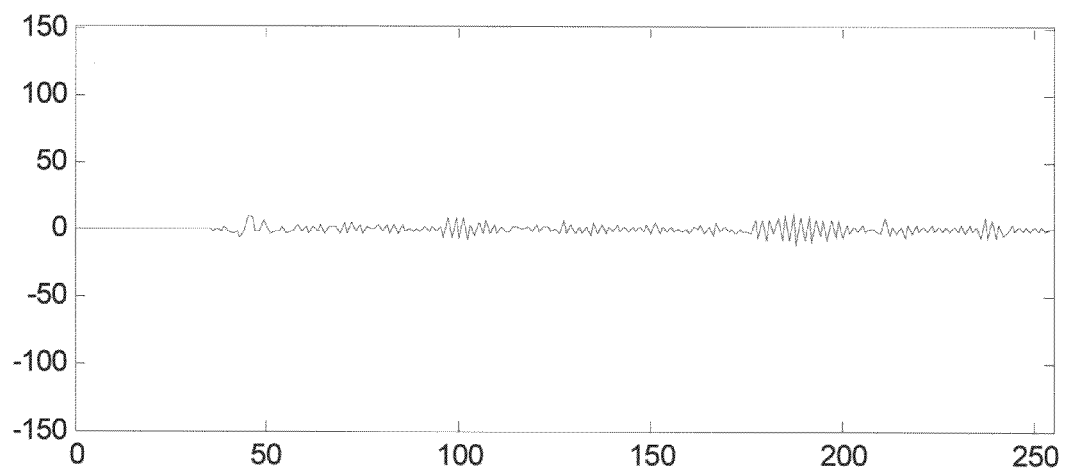
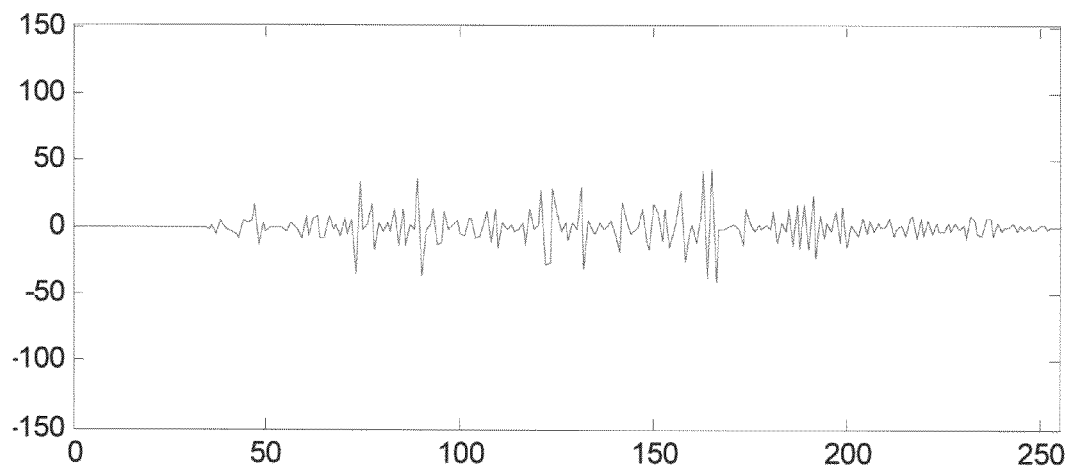
FIG. 23B

FIG. 23C
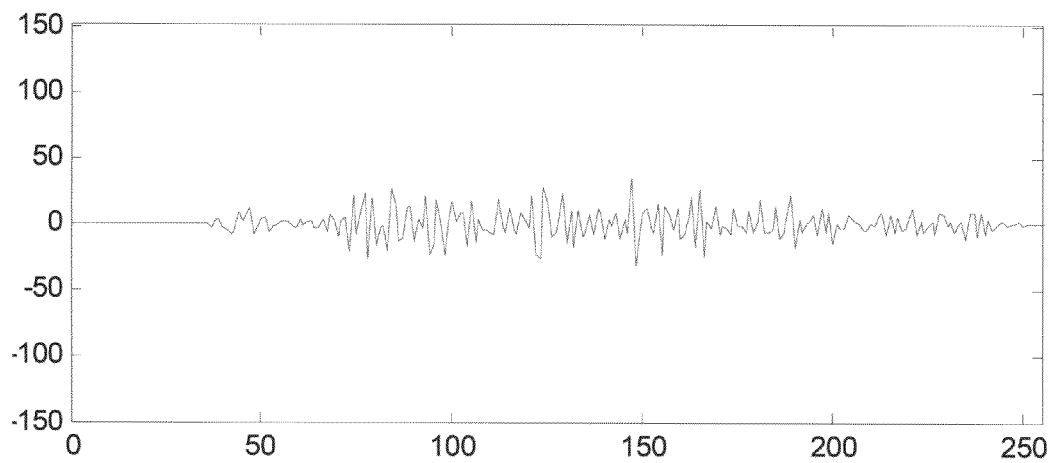
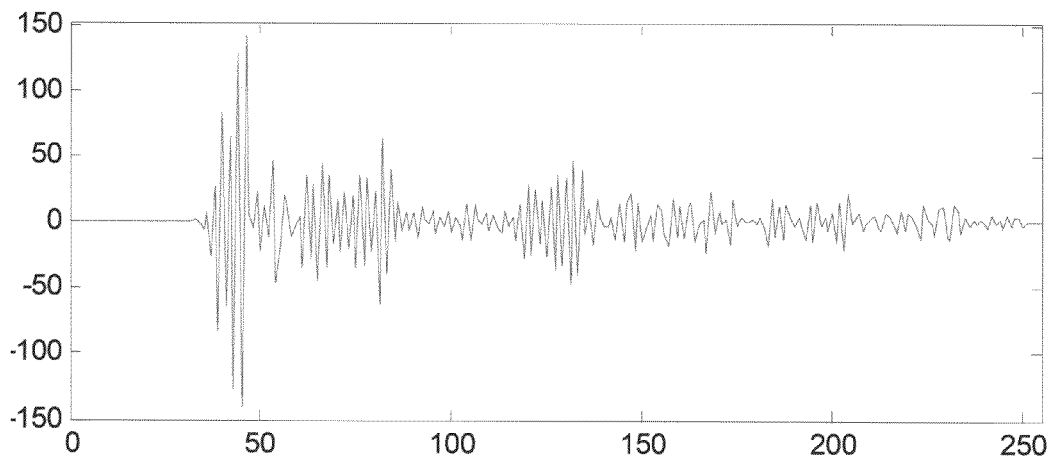
FIG. 23D

FIG. 24A
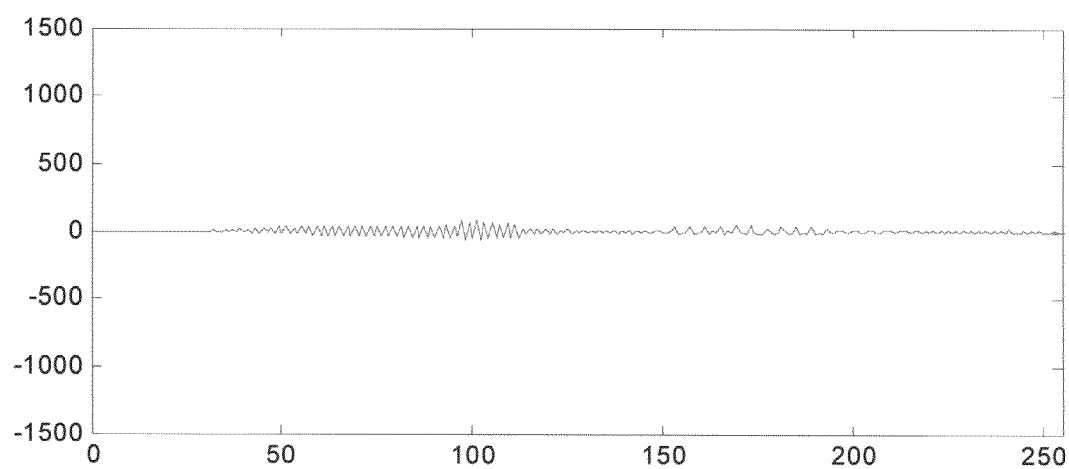
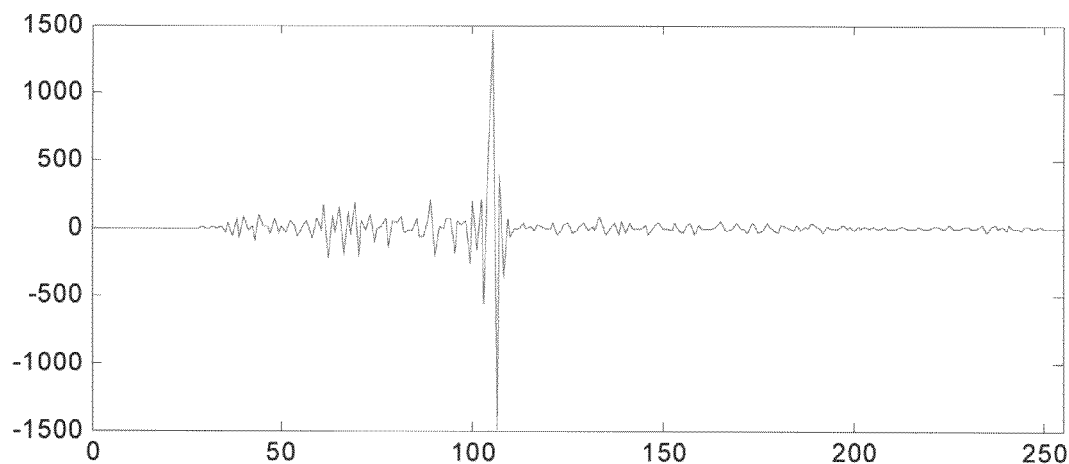
FIG. 24B

| Image RMS | | | | |
|---|---|---|---|---|
| | Image | Presented Method | BPCS Method | Stego Size |
| Girl |  Size 66k | 3.915 | 15.306 | 6k |
| Golden Gate |  Size 65 k | 5.180 | 10.061 | 6k |
| Trolley |  Size 65 k | 8.818 | 15.780 | 6k |
| Rock |  Size 65 k | 0.335 | 7.329 | 6k |
| Sarkis |  Size 65 k | 0.325 | 7.255 | 6k |

| Image RMS | | | | |
|---|---|---|---|---|
| Image | RGB | YCbCr | BPCS | Stego |
|  | 0.331 | 0.341 | 18.713 | 6k |
|  | 5.180 | 3.393 | 10.061 | 6k |
|  | 8.180 | 0.335 | 15.780 | 6k |
|  | 0.335 | 0.339 | 7.329 | 6k |
|  | 0.325 | 0.331 | 7.255 | 6k |

US 8,369,568 B2

METHODS AND SYSTEMS FOR DIGITAL IMAGE SECURITY

CROSS-REFERENCE TO RELATED APPLICATIONS

This application is a divisional of U.S. patent application Ser. No. 11/740,742 filed Apr. 26, 2007, now U.S. Pat. No. 7,965,861 which claims priority to Provisional Application No. 60/745,729 filed Apr. 26, 2006. The entire text of each of the above-referenced disclosures is specifically incorporated by reference herein without disclaimer.

BACKGROUND OF THE INVENTION

1. Field of the Invention The present invention relates generally to image processing. More particularly, the present disclosure relates to methods for encrypting digital images.

2. Description of Related Art

The use of digital documents, medical images, and satellite images has been increasing exponentially along with the interest in image compression algorithms. One of the most important problems in various applications is the data storage and transmission which in many situations resolved by the compression techniques. Compression is defined as the reduction in size (in bytes) of a data/image with acceptable distortions in its quality. There are various compressions techniques proposed that compress the binary data like Huffman coding, Run length coding, etc. The conventional lossless compression algorithms are ineffective in compressing data with low redundancy (like least significant bit-planes).

The referenced shortcomings are not intended to be exhaustive, but rather are among many that tend to impair the effectiveness of previously known techniques for generating an image processing; however, those mentioned here are sufficient to demonstrate that the methodologies appearing in the art have not been altogether satisfactory and that a significant need exists for the techniques described and claimed in this disclosure.

SUMMARY OF THE INVENTION

The present disclosure provides a novel steganographic algorithm for different image models, and in particular, embedding secure data in a layer of a host image. In one respect, the algorithm may embed secure data within a best embeddable region of a layer (e.g., a selected color layer, a significant bit layer, etc.).

In one respect, the algorithm may provide an option of selecting the best color models for embedding purposes. This achieves introducing higher embedding capacity with less distortion as compared to conventional techniques. In addition to or alternatively, the algorithm may provide the use of a complexity measure for cover images in order to select the best of the candidate layers for the insertion of the steganographic information.

In one embodiment, a cover or host image may be decomposed into several color layers. The image may be converted into several color layers using, for example, the following color models: RGB (red, green, blue), YCbCr (luminance, chrominance blue, chrominance red), YIQ (luminance, intensity, chrominance) HSV (hue, saturation, value), CMY (cyan, magenta, yellow), CMYK (cyan, magenta, yellow, black), and/or other documented color models. In one respect, the image may be decomposed using a best color model for a given image and secure data.

Once the image is decomposed, the embeddable regions may be selected. In one respect, a layer or multiple layers are chosen from the selected model. The layer(s) identified by the measure as the key color within the image are selected for embedding. It is noted that the color layer may vary with different images and color models.

Next, the selected embeddable layer may be categorized into non-overlapping embeddable or non-embeddable regions. The identified region may further be categorized for the measured upper boundary of the maximum capacity in bits that can be altered without causing perceptual differences. In one embodiment, the embedding procedure takes place in the selected regions which may include multiple layer bit planes. Subsequently, a color reduction development step may be performed.

In other respects, the algorithm may embed secure data in a least significant bit layer of a host image (e.g., a digital carrier 8-bit grayscale or 24-bit color imagery). Areas of high noise resemblance may be detected using a measure gauge local variation. Digital message (e.g., secure data) may be hidden by modifying the least bit layers of best host pixels. Subsequently, computational processes may be incorporated to retain the statistical structure that is associated with the host image. A first order stego capacity measurement may be taken, which enables an optimal selection of the parameters to be applied during the embedding process. This measurement may evaluate the approach taken and gives a resultant value which may depict the affects of the embedding process from a root mean square error and first order statistical point of view.

In one embodiment, a host image may be processed and analyzed according to the variation measurement. A stego file may be acknowledged and an extraction tag is formed to enable an extraction and reconstruction of the received stego image. The stego image may be converted into a binary string and a threshold selection process may be performed based on, for example, the size of the stego file to be embedded and/or the values dictated by a first-order stego capacity measurement (FOSCM). The selected threshold process may ensure an even distribution of stego information upon the host image and may select. In addition to or alternatively, the threshold value may provide security from different types of detection processes.

Once host pixels from the host image have been identified, the data from the first stage may be forwarded to a second stage which embeds the secure data. In one respect, the embedding process may occur simultaneously with a histogram retention algorithm used for statically or dynamically updating record of occurring events in the embedding process. This may reduce the first-order statistical modifications. For example, if the insertion of the secure data requires changing of the value of the original pixel in the host image, the occurrence is noted. Simultaneously, every time a change in an original pixel is required, the records are queried and the pixel is modified to a value that may counteract any previous changes. This step is possible due to the fact that, when a pixel value must be changed, there may be a lower pixel value and a higher pixel value that will reflect the desired bits in the least significant values. A tag may subsequently be inserted, resulting in a host image ready for transmission.

In other respects, the algorithm may decompose a digital media or signal into its binary format representation. Next, a pseudo noise sequence may be generated using for example, M-Sequence, gold codes, chaotic, and the like. The decomposed digital media or signal may be encrypted using, for example, the pseudo noise (Pn) sequence. A Pn-sequence matrix may be generated by segmentation of the pseudo noise sequence.

In addition or alternatively, a simultaneous compression and encryption process whereby a digital media may be compressed is presented. The technique may reduce transmission time and storage space of the signals. The encryption method/system includes the steps of converting an image into a binary bit stream; transforming the binary bit stream into binary vector; and segmenting binary vector into various segments. The compression method/system includes the steps or generating a random sequence (for example M-sequence, gold codes, etc.); developing a code matrix based on the random sequence; determining the distance measure between code matrix and each segmented binary vector, generating a key based on the distance measure. Combine all the keys generated and append the keys used to segmenting and random sequence generating to obtain a compressed and encrypted image. Any encryption technique made on the image decreases the redundancy, making the method/system suitable for use in compressing encrypted images. In addition, this method/system may be used to compress noise like signals, represent any multi-media data (e.g., images, audio, video, and other media sources). This method/system may be applied for any application that requires authentication, data integrity, data confidentiality, and data security.

In embodiments where the digital media or signal includes high redundancy, the digital media or signal may be reconfigured with respect to pseudo noise sequence generated. Subsequently, the digital media or signal may be correlated and applied to a logical operation between two selected columns of the Pn-sequence matrix to generate a sequence close to or equivalent to the segmented media.

The steps of segmentation and configuration may be repeated with a new sequence shift code and a selected column of Pn-sequence matrix until a maximum estimate of the original digital media or signal is completed. The algorithm may subsequently be recombined by reassembling the binary formats of the shifts codes to generate a new compressed image.

To decode the compressed image, the compressed image may be decomposed into its binary stream presentation. A Pn-sequence may be generated using information encrypted into the compressed image. A Pn-sequence matrix may be generated by segmentation of the Pn-sequence. Using two columns of the Pn-sequence matrix, a correlation of logical operations may be used to retrieve sequence closer to the digital media or signal. The original digital media may be retrieved by randomizing the digital media or signal with respect to pseudo noise sequence generated if it was reconfigured initially.

In one embodiment, the algorithm may be implemented on a processor, where the processor may be any computer-readable media known in the art. For example, it may be embodied internally or externally on a hard drive, ASIC, CD drive, DVD drive, tape drive, floppy drive, network drive, flash drive, USB drive, or the like. The processor is meant to indicate any computing device capable of executing instructions for receiving the data from amongst other functions. In one embodiment, the processor is a personal computer (e.g., a typical desktop or laptop computer operated by a user). In another embodiment, the processor may be a personal digital assistant (PDA) or other handheld computing device.

In some embodiments, the processor may be a networked device and may constitute a terminal device running software from a remote server, wired or wirelessly. Input from a user, detector, or other system components, may be gathered through one or more known techniques such as a keyboard and/or mouse. Output, if necessary, may be achieved through one or more known techniques such as an output file, printer, facsimile, e-mail, web-posting, or the like. Storage may be achieved internally and/or externally and may include, for example, a hard drive, CD drive, DVD drive, tape drive, floppy drive, network drive, USB drive, flash drive, or the like. The processor may use any type of monitor or screen known in the art, for displaying information. For example, a cathode ray tube (CRT) or liquid crystal display (LCD) can be used. One or more display panels may also constitute a display. In other embodiments, a traditional display may not be required, and processor may operate through appropriate voice and/or key commands.

In some respects, a method for producing a compressed and encrypted image is provided. An image may be converted into a binary bit stream, and the bit stream may be decomposed into a plurality of segments (of a fixed length and/or various lengths). A binary sequence based on a first key may be generated and may be used to generate a code matrix. A distance between the code matrix and the distance may be determined for each of the plurality of segments. Using a combined first and second key, a compressed and encrypted image may be obtained.

In other respects, a compressed image of a cover image may be provided. The cover image may be converting the cover image into a binary bit steam. The bit streams may be decomposed into a plurality of segments (e.g., the plurality of segments having various lengths). Next, each of the plurality of segments may be classified using a redundancy of hits based on a first key to generate a plurality of redundant and non-redundant segments. The redundant segments and non-redundant segments may be compressed. In one embodiment, the non-redundant segments may be compressed with low redundancy based on a second key. The combination of the compressed redundant and non-redundant segments may form the compressed image of the cover image.

The terms "a" and "an" are defined as one or more unless this disclosure explicitly requires otherwise.

The term "substantially," "about," and its variations are defined as being largely but not necessarily wholly what is specified as understood by one of ordinary skill in the art, and in one-non-limiting embodiment, substantially and its variations refer to ranges within 10%, preferably within 5%, more preferably within 1%, and most preferably within 0.5% of what is specified.

The term "coupled" is defined as connected, although not necessarily directly, and not necessarily mechanically.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The following drawings form part of the present specification and are included to further demonstrate certain aspects of the present invention. The invention may be better understood by reference to one or more of these drawings in combination with the detailed description of specific embodiments presented herein.

FIGS. 12A and 12B show corruption of first-order statistics, in accordance with embodiments of the disclosure.

FIGS. 15A through 15J show test image, in accordance with embodiments of the disclosure.

FIGS. 16A and 16B show graph results of First-Order Stego Capacity Measure, in accordance with embodiments of the disclosure.

FIGS. 23A through 23D show histogram difference of Stego images with 10% information, in accordance with embodiments of the disclosure.

FIGS. 24A through 24D show histogram difference of Stego images with 80% information, in accordance with embodiments of the disclosure.

DESCRIPTION OF ILLUSTRATIVE EMBODIMENTS

Figure 1:
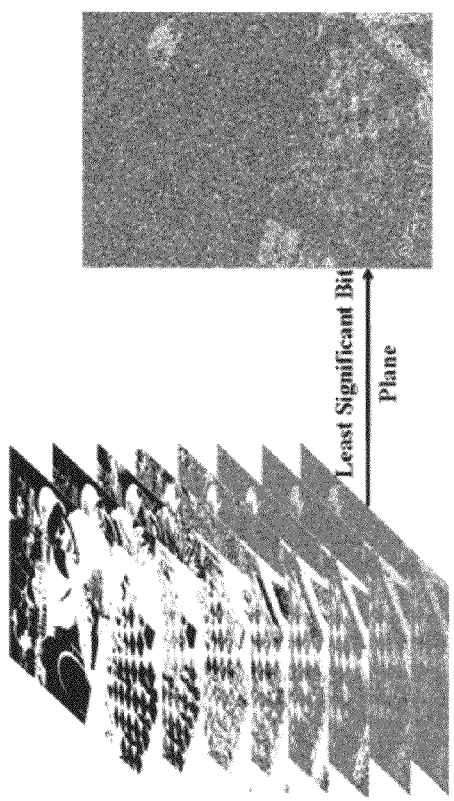
FIG. 1 show various bit plane decomposition and a Least Significant Bit (LSB) plane, in accordance with embodiments of the disclosure.

The invention and the various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Simultaneous Compression and Encryption of Noise Like Signals

In recent years, the applications of pseudo noise (Pn-) sequence are spreading through various fields and are increasing rapidly. Some particular fields are communications (CDMA), cryptography, signal detection, and identification in multiple-access communication systems. Pn-sequence is unique because of its spectral distribution and noise like qualities of the waveform. A random stream shows similar statistical behavior that of the same size Pn-sequences. The prime advantages of a Pn-sequence are randomness and orthogonality of the sequence shifts which are employed in representation and compression of the random data/media.

Compression of random data is vital and difficult for data that has low redundancy and whose power spectrum is close to noise. In most imaging operations (such as medical, military, etc.) compression of all the bit-planes is vital. Since the least significant bit (LSB) planes data is random or has less redundancy, it is hard to compress using the conventional compression algorithms. Similarly, in steganography, the secured information is embedded in the least significant bit planes of the cover image. Thus, the cover image with the secured data needs to be stored or transmitted over internet. But using conventional compression algorithms, the bit-plane information may be lost or compression of data is not effective.

In most data hiding cases, the stego/secured information needs to transformed or represented such that it is random before embedding into cover digital media. Thus, enhances the security level of the embedded information.

In this disclosure, a novel combined compression and encryption technique for noise like data using pseudo noise (Pn) sequence such as M-, Gold, and Kasami sequence is introduced. First, a set of random sequences may be generated. These Pn-sequences may be broken into various segments of same length as that of input. If the data is redundant, then the data is reconfigured using a Pn-sequence. This decreases the redundancy of input data and thus, makes data more suitable for the compression. These operations may result in a compression and encryption. Further, the proposed algorithm may be applied to various random data used in other applications.

Two Algorithms for Compressing Noise Like Signals

As noted above, compression is a technique that is used to encode data so that the data needs less storage/memory space. Compression of random data is vital in case where data needed to be preserved has low redundancy and whose power spectrum is close to noise. In case of steganographic images, the least significant is of high importance upon compressing with lossy algorithms the LSB might get lost. Since the LSB plane data has low redundancy, lossless compression algorithms may be affecting a good compression ratio. These problems motivated in developing a new class of compression algorithms. In this disclosure, compression technique are provided for compressing random data like noise with reference to known pseudo noise sequence generated using a key. Furthermore, the proposed algorithms can be extended to all kinds of random data used in various applications.

Run length, Huffman code, Arithmetic coding, and the like are effective in compressing data that has redundancy. But if the data to be compressed is not redundant or random in nature, then the existing compression algorithms may not have a high compression ratio. For example, consider various bit-planes of an image as shown in the FIG. 1. In most medical imaging operations compression of all the bit-planes is vital. Since the LSB planes data is random or has less redundancy hence compression ratio using the normal compression algorithms is minimal.

Figure 2:
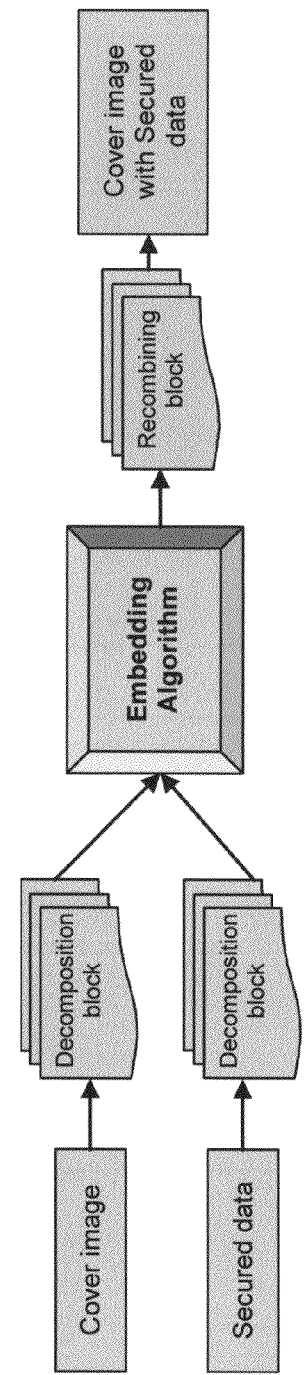
FIG. 2 shows a flow chart of a time domain data hiding technique, in accordance with embodiments of the disclosure.

Steganography is a process of secretly embedding secured information in a harmless digital media without changing its perceptual or audible quality. Digital steganography and watermarking are currently active research areas in signal processing that deals with encompassing methods of copyright protection, image authentication, and secured communications. Several algorithms for data hiding in digital media have been proposed in both the time and frequency domain. The present disclosure provides techniques in the time domain where the secured data is embedded in the least significant bit planes (LSB planes) of the cover image. A simple block diagram scheme for embedding secured data into the cover image is as shown in FIG. 2.

Figure 3A:
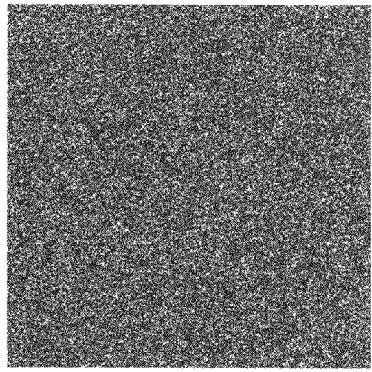
FIGS. 3A through 3C show images used for embedding secure data, in accordance with embodiments of the disclosure.
Figure 3B:
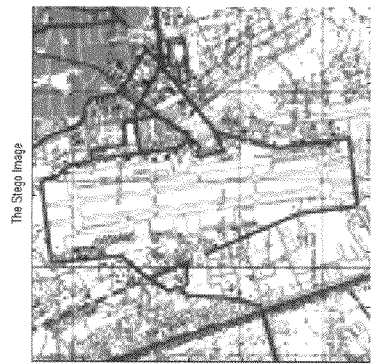
Figure 3C:
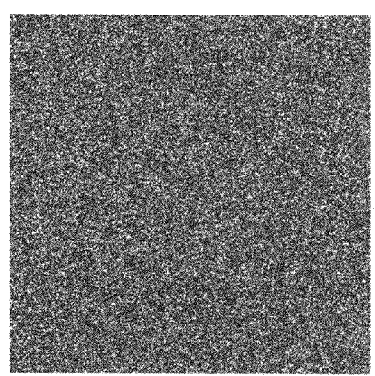

For example, consider a LSB plane of a cover image, the secured data to be embedded and the cover image's LSB with the embedded secured data as shown in FIGS. 3A, 3B, and 3C. FIG. 3A shows a least significant bit plane of a cover image. FIG. 3B shows a road map image to be imbedded. FIG. 3C show a LSB after embedding the image shown in FIG. 3B to FIG. 3A. The information in the cover image with stego LSB plane may be random and may have minimal redundancy, therefore, normal compression algorithms are not effective. The cover image with the secured data may need to be stored or transmitted over Internet.

In some embodiments, some particular fields like communications (CDMA), cryptography, and signal detection and identification in multiple-access communication systems need additional or optional image processing. The present disclosure use M-sequence because of the autocorrelation, spectral distribution, and noise like qualities of the waveform for these and other application. A random sequence generated using a pseudo noise generator may be employed in coding the secured data and then is added to LSB plane of the data message. The prime advantages of an M-sequence with a high period are an excellent effect of randomness and associated autocorrelation properties. The PN sequences and M-sequence is described in more details below.

Pseudo Noise (Pn) Sequences

In this disclosure, a compression technique that compresses the random data like noise with reference to binary pseudo noise sequence generated is provided. A first algorithm "Simple Pn-sequence based compression" may utilize a Pn-sequence for representing the random digital media with respect to keys. The logical operations may be considered for decreasing the errors arise during the decoding processing. The total random digital media length may be considered for compressing hence it provides a high compression ratio.

In other respects, a second algorithm, "Multi Pn-sequence based compression" proposes the whole random data may be broken into various segments, allowing for the encoding of any kind of randomness in the digital media. This technique may use a combination of randomizing and compression of the digital media, reducing errors in decoding and can successfully compress any kind of digital media.

Figure 4:
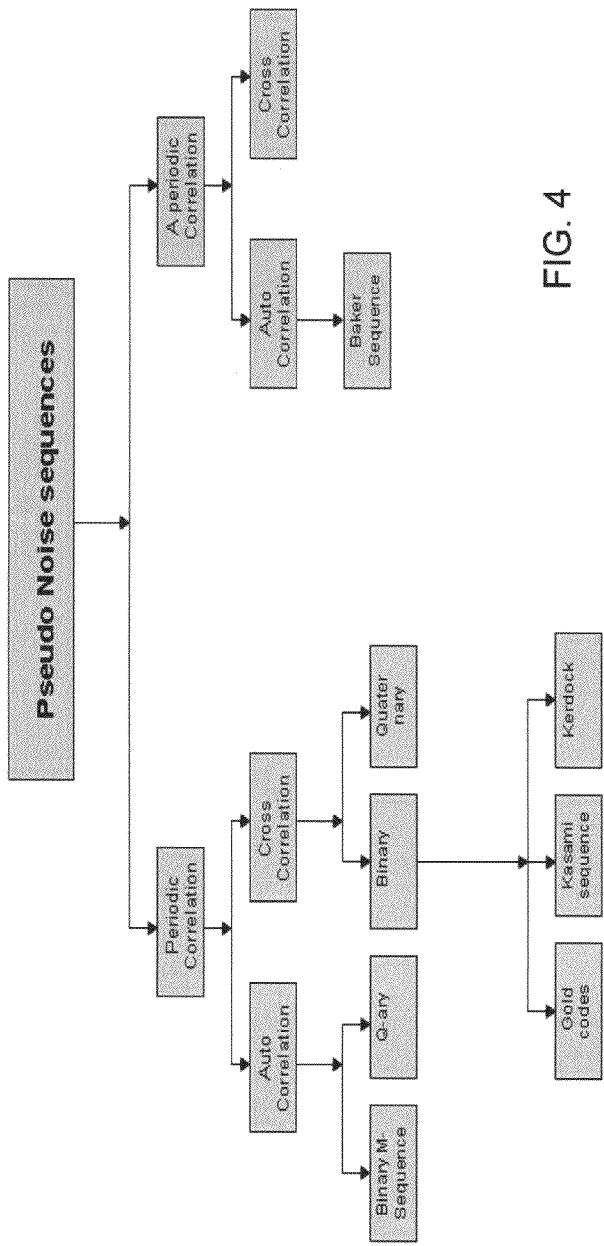
FIG. 4 shows a general overview of Pseudo Noise Sequences, in accordance with embodiments of the disclosure.

In this section, a general definition and overview of the Pseudo Noise (PN) Sequences of the present disclosure is provided. A pseudo noise sequence, as used and defined herein, is a periodic binary sequence that is normally generated using linear feedback shift registers and well defined logic. These sequences may be semi-random, i.e. they are random in a particular period, but after each period, the sequences may repeat itself. The waveform of PN sequences may be similar to noise-like waveform. A Pseudo Noise sequence of sufficient length may have similar properties of a random data stream. The various Pseudo noise sequences that are commonly used are M-sequence, Gold codes and etc., the M-sequence is simplest in form of the pseudo noise sequences. FIG. 4 shows in general, an over view of various pseudo noise sequences.

M-sequence is a pseudo random binary sequence that may be generated by a linear feedback shift register with a generating polynomial (primitive) in which coefficients arise from Galois field. If the period of the pseudo random binary sequence is equal to about $2^n-1$ (n is the degree of the polynomial), it is called a maximum-length sequence (or M-sequence). An M-sequence may also be defined as a maximum-length shift register sequence. M-sequence is one of the simplest pseudo noise sequences. M-sequence may include various properties including:

1) Runs of M-sequence:—The numbers of runs of one's is equal to runs of zero's. In addition, the number of the total runs of an M-sequence of order "N" is given by $$\text{The total number of runs} = 2^{N-1} \quad \text{Eq. 1}$$

Note:—
½ the runs will be one bit long;
¼ the runs will be 2 bits long;
⅛ the runs will be 3 bits long; up to a single run of zeroes that is 'N−1' bits long and a single run of ones that is 'N' bits long.
Example:—Consider an M-sequence of order "4" of Tap code [3, 4] and then find the total number of runs.
Solution:—M-sequence of Tap code [3, 4] is [1 1 1 1 0 0 0 1 0 0 1 1 0 1 0]
a) The total runs are $2^{4-1}=8$. From the above Sequence the runs are shown as [4 3 1 2 2 1 1 1] i.e., 8.
b) The Number of runs for ones is 4 and the number of runs for zeros is 4. Hence forth, the number of runs for one=the number of runs for zero.

| Runs | Zero's | One's |
| --- | --- | --- |
| 4 | — | 1 |
| 3 | 1 | — |
| 2 | 1 | 1 |
| 1 | 2 | 2 |

2) Balance Property:—The number of ones is one more than the number of zeros in an M-sequence of order 'N'.
Example:—Consider an M-sequence of order "4" of Tap code [1, 4] then find the total number of runs.
Solution:—M-sequence of Tap code [1, 4] is [1 1 1 1 0 1 0 1 1 0 0 1 0 0 0];
a) Number of ones in the above sequence=8;
b) Number of zeros in the above sequence=7;
Hence forth, number of ones=number of zeros+1.

3) Shift and Add property:—It is a well known property in which the modulo-two addition of any two identical M-sequences with different phases generates another identical M-sequence, but with another phase.
Example:—Consider an M-sequence of order "4" of Tap code [1, 4] then find the total number of runs.
Solution:—M-sequence of Tap code [1, 4] is [1 1 1 1 0 1 0 1 1 0 0 1 0 0 0];
The shifted M-sequence after a shift two to right is [1 1 0 1 0 1 1 0 0 1 0 0 0 1 1];
Upon Adding both the M-sequence and the shifted M-sequence is:
[0 0 1 0 0 0 1 1 1 1 0 1 0 1 1] i.e. a shifted M-sequence with shift of '7' to right.

4) Correlation:—M-sequence has good bi-level auto-correlation characteristics with values of −1 and N, but the cross-correlation property of the M-sequences is relatively poor.

Algorithm

Figure 5:
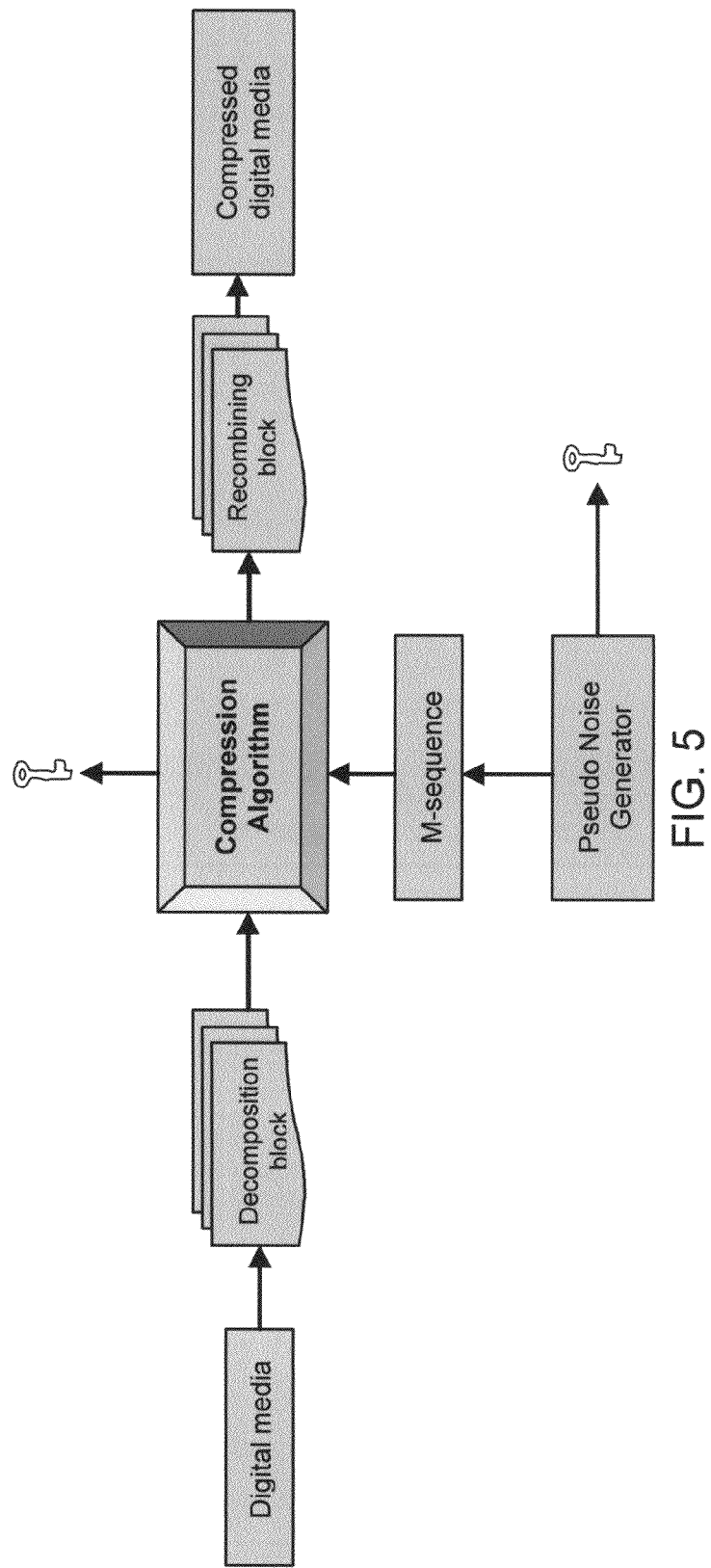
FIG. 5 shows a flow chart for encoding cover signal or data using. Pseudo Noise Sequence into a compressed signal or data ('Simple Pn-sequence encoder'), in accordance with embodiments of the disclosure.

In this section, a new class of compression algorithms based on the M-sequence which compress random data (for example, bit-planes with secured information or LSB planes of the cover image) is presented. The block diagram for 'Simple Pn-sequence encoder' is presented in FIG. 5.

The general encoding steps of compression algorithm include inputting the digital media or signal and decompose into its binary format representation. Next, a PN-sequence (M-sequence) may be generated from a pseudo noise generator using a key and generate the Pn-sequence matrix. The generated sequence may be correlated and logical operations between two selected columns of a Pn-sequence matrix may be applied to generate a sequence close to the cover signal. The correlation and logical operation step may be repeated with a new sequence code and a selected column of Pn-sequence matrix until fixed iterations are achieved. The binary formats of the new sequence code may be recombined to generate a new compressed image.

Figure 6:
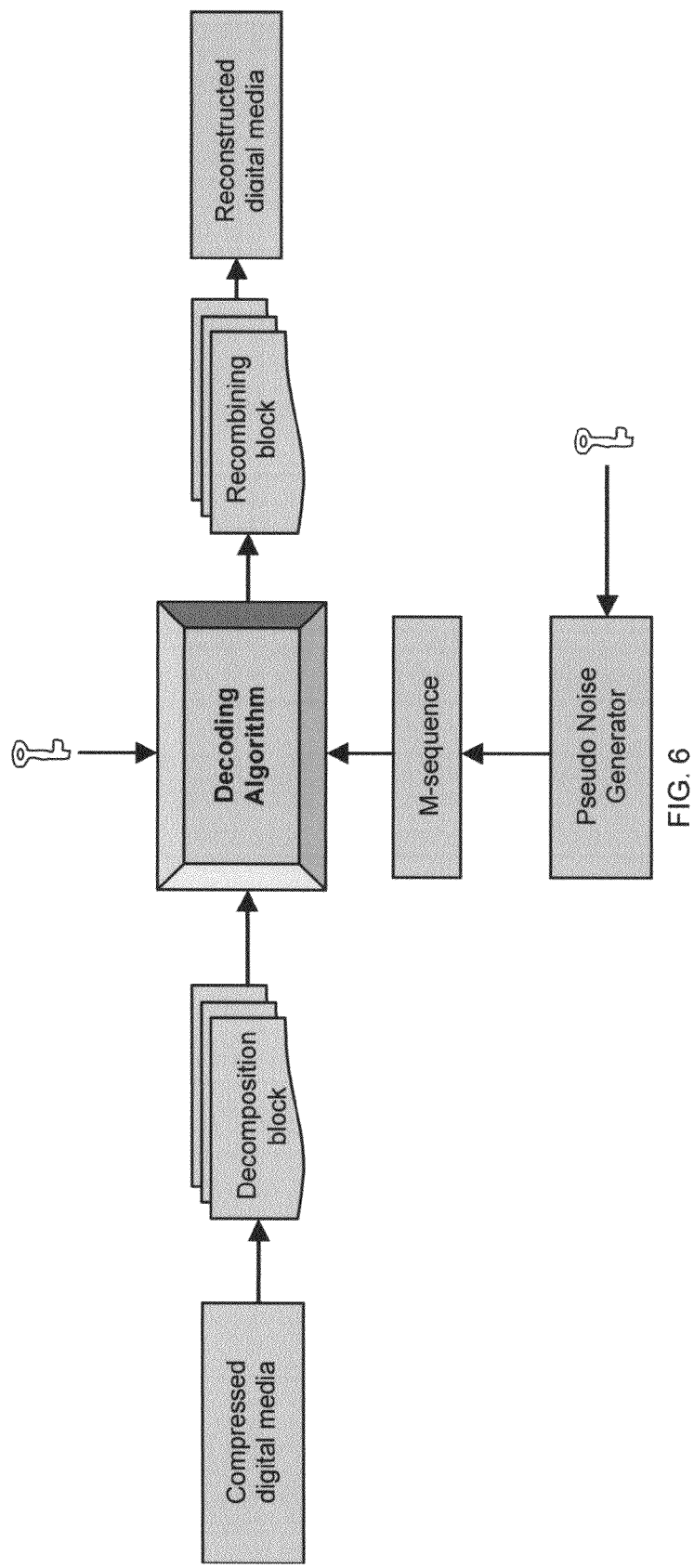
FIG. 6 shows a flow chart for decoding compressed data using Pseudo Noise Sequence to reconstruct the cover signal or data ('Simple Pn-sequence decoder'), in accordance with embodiments of the disclosure.

The generated compressed image may have no relationship with the cover image. In one embodiment, to retrieve the information from compressed the image may be done by processing the compressed using decoding algorithm and the set of keys. The block diagram for 'Simple En-sequence decoder' is presented in the FIG. 6.

The general decoding steps include inputting compressed keys and decompose the keys into its binary format representation. A pseudo noise sequence (M-sequence) may be generated from a pseudo noise generator using a key and generate the Pn-sequence matrix. The generated sequence may be correlated and logical operations between two selected columns of a Pn-sequence matrix using the key to retrieve a sequence similar to a cover signal. The correlation and logical operation step may be repeated with a new sequence code and a selected column of Pn-sequence matrix until fixed iterations are achieved. The binary format of final sequence code from the previous step may be recombined to retrieve the cover digital media or signal.

The 'Simple Pn-sequence based compression algorithm' may compress random data successfully, however, the decoding algorithm may introduce errors on reconstruction of the original data, and also when the data has high redundancy. The algorithm may not be effective and may introduce a higher amount of errors on reconstruction of data. This motivated in developing 'Multi Pn-sequence based compression algorithm' which has similar frame work as 'Simple Pn-sequence based compression' algorithm but includes segmentation block and representation blocks in order to overcome the above problems discussed above.

Segmentation Block

The segmentation block takes the input M-sequence which may be used as a reference for compressing the data. The segmentation block may be broken into various segments having same length as that of input. In one respect, the number of reference sequences generating multiple Pn-sequences that are defined by a key may be increased. In addition or alternatively, the compression ratio of the data may be increased and the errors arise during the reconstruction of the original data may be decreased. The segmentation block's output sequences may also defined by a key.

Data Configuration Block

The data configuration block may take the data and Pn-sequence as inputs and reconfigures the data thus decreasing the redundancy of input data and making data more suited for the compression. The 'Multi Pn-sequence based compression algorithm' increases the compression ratio and also minimizes the loss of data during the decoding of the compressed data. The general encoding steps of compression algorithm includes inputting digital media or signal and decompose the data into its binary format representation. A pseudo noise sequence (M-sequence) from a pseudo noise generator using a key may be generated and a Pn-sequence matrix by segmentation of sequence may be constructed. The digital media may be reconfigured by randomizing the media with respect to pseudo noise sequence generated. The reconfigured data may be correlated and logical operations may be between two selected columns of Pn-sequence matrix to generate a sequence close to the segmented signals. The correlation and logical operation step may be repeated with a new sequence code and a selected column of Pn-sequence matrix until fixed iterations are achieved. The binary formats of the keys may be recombined to generate a new compressed image.

The general decoding steps of compression algorithm include inputting the compressed keys and decompose the keys into its binary format representation. Next, a pseudo noise sequence (M-sequence) from a pseudo noise generator using a key may be generated and a Pn-sequence matrix may be constructed by segmentation of sequence. For two columns of Pn-sequence matrix a correlation step and a logical operation step may be applied using the key to retrieve a sequence close to the cover signal. The correlation and logical operation step may be repeated with a new sequence code and a selected column of Pn-sequence matrix until fixed iterations of the key are achieved. The original digital media may be retrieved by randomizing the media with respect to pseudo noise sequence generated. Binary formats segments may be recombine to retrieve the reconstructed digital media or signal.

Computer Simulation

Figure 7C:
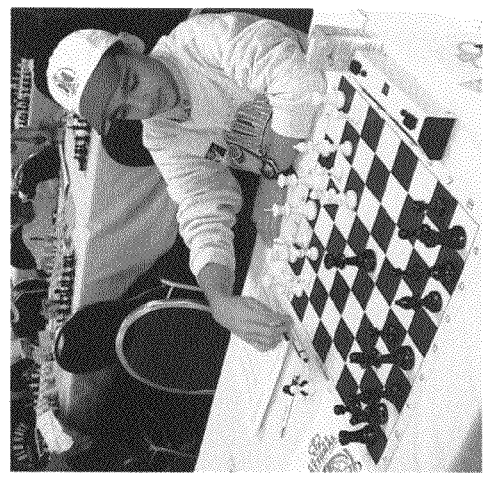
FIGS. 7A through 7C are various images used in an analysis, in accordance with embodiments of the disclosure.
Figure 7B:
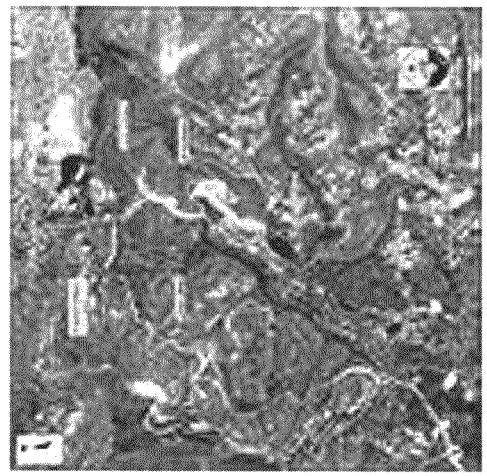
Figure 7A:
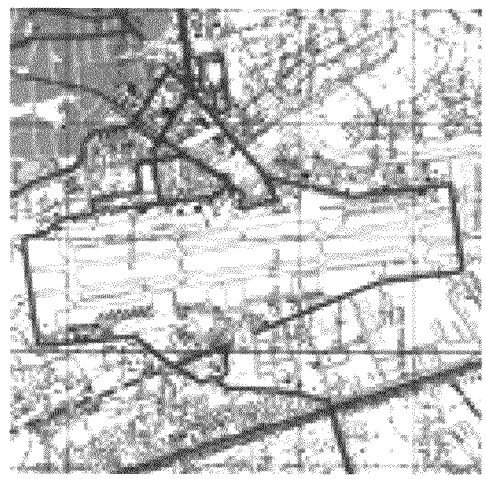

For computer simulation, the method of the present disclosure was tested over 50 images of various sizes from NSP lab's image database and various random signals/data. The experimental results are presented for some of the images of various sizes and the random data for varying length. The various images utilized for simulation are shown in FIGS. 7A, 7B, and 7C (FIG. 7A is a road map image, FIG. 7B is a satellite picture of the river, and FIG. 7C is a picture of a little boy). In addition, random digital data generated for various lengths (16 to 512) were tested.

Table 1 below presents the simulation results using 'Simple Pn-sequence based compression' algorithms for compressing digital image LSB bit-planes and various lengths of data generated for 3 trials. The various images with varying sizes are utilized and the last three bit-planes are used in simulation testing. 'Bit-plane 1' indicates the least significant bit planes and follows. In addition, the simulation results for 3 trials are presented in case of random data since at each trial the randomness of data obtained is different.

TABLE 1

Simulation results using the proposed ('Simple Pn-sequence based compression') algorithm

| Image (size) | Bit-plane1 | Bit-plane2 | Bit_plane3 | Random data length | Trial 1 | Trial 2 | Trial 3 |
| --- | --- | --- | --- | --- | --- | --- | --- |
| Boy image (512 × 512) | 0.869 | 0.922 | 0.942 | 31 | 0.903 (28) | 0.903 (28) | 0.742 (23) |
| River (256 × 256) | 0.873 | 0.915 | 0.949 | 63 | 0.667 (42) | 0.857 (54) | 0.810 (52) |
| Road map (128 × 128) | 0.891 | 0.923 | 0.959 | 255 | 0.824 (210) | 0.769 (196) | 0.714 (182) |

From Table 1, the least significant bit planes are effectively compressed. In addition, for high significant bit-planes, the redundancy in the bit plane may increase, thus decreasing the compression ratio. Hence we developed 'Multi Pn-sequence based' compression algorithm which randomizes and segments the image information thus decreasing the redundancy. The segmentation block and the data configuration blocks are vital.

Figure 8:
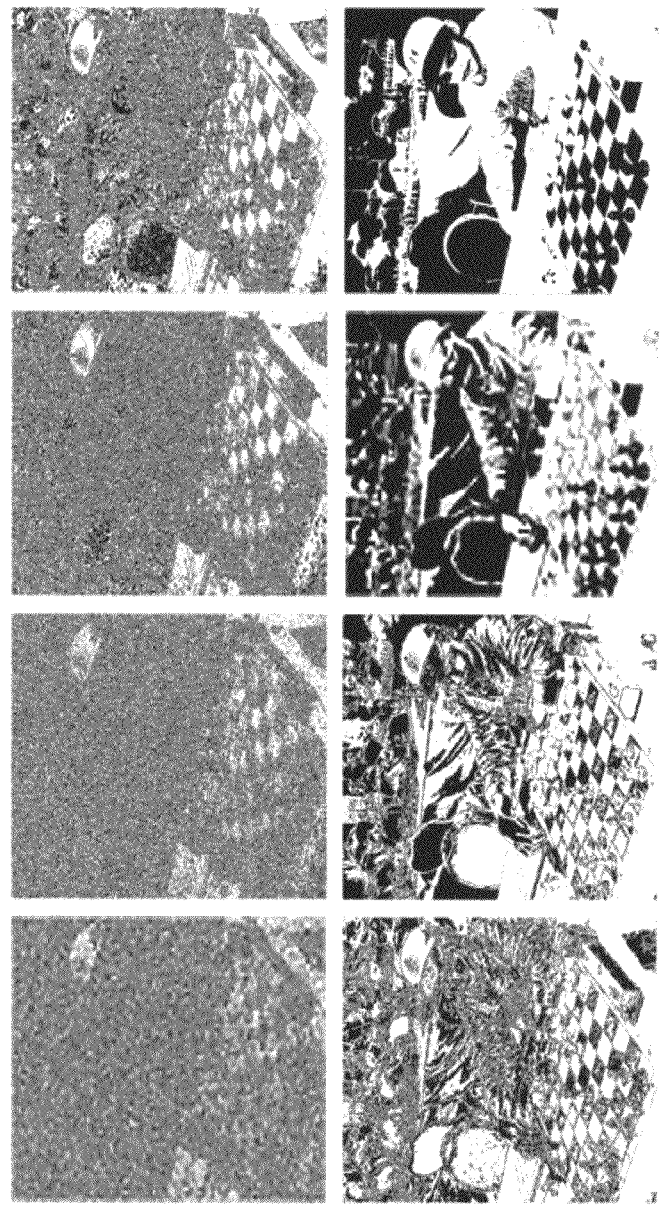
FIG. 8 shows a bit plane decomposition of the red layer of FIG. 7C, in accordance with embodiments of the disclosure.
Figure 9:
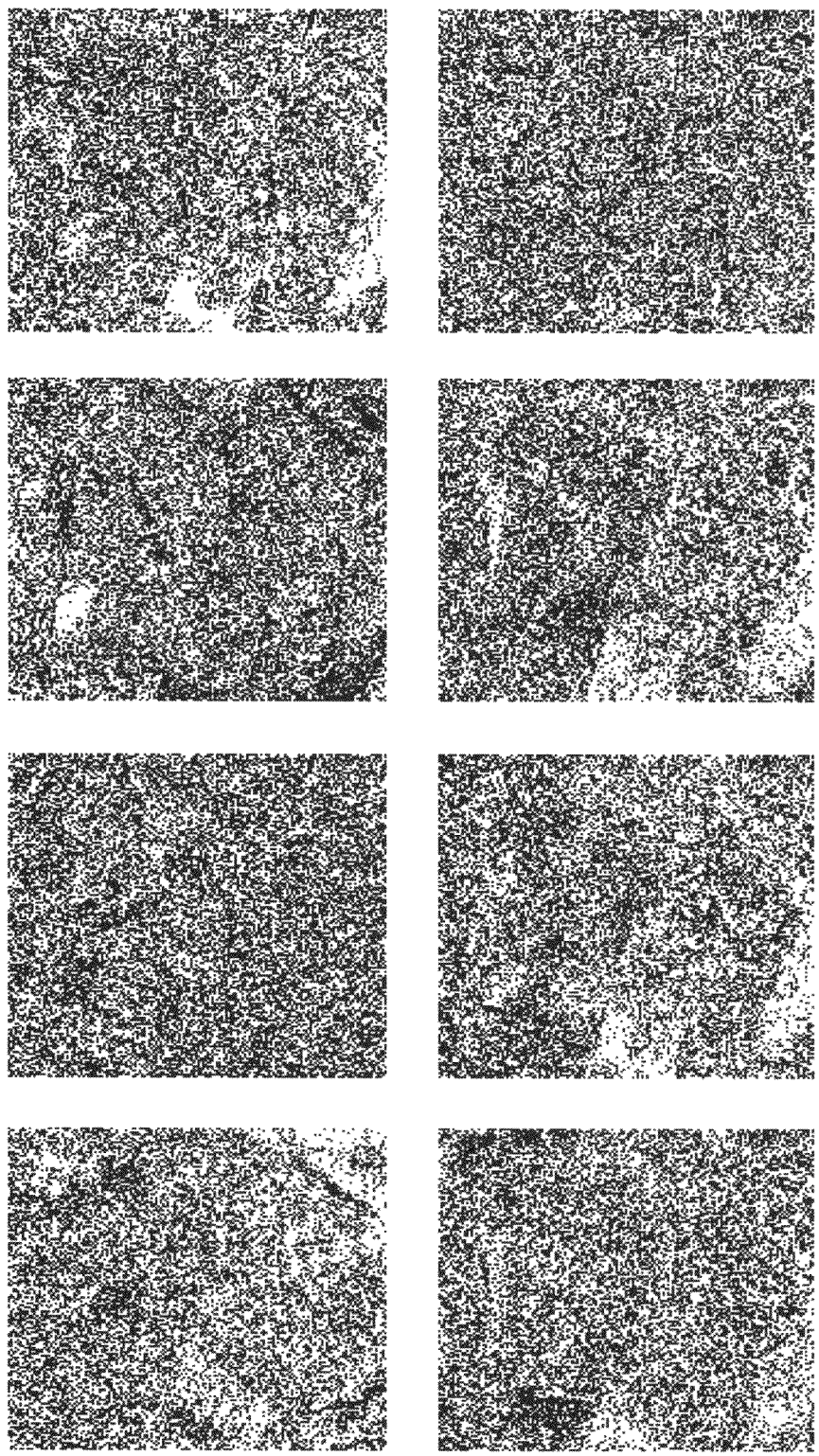
FIG. 9 shows a bit plane decomposition of the red layer of FIG. 7C represented using a M-sequence, in accordance with embodiments of the disclosure.

For example, a comparison between the bit-planes for FIG. 7C of size 512 by 512 was performed. FIG. 8 shows the original bit-plane decomposition for the red layer of FIG. 7C. FIG. 9 shows the same bit planes of FIG. 7C's red layer after the data is reorganized using the data reconfiguration block. The redundancy in case of high significant bit-planes may be reduced and also the new classes of hit-planes may have similar similarities thus increasing the compression ratio of the whole image.

Table 2 below presents the simulation results using 'Multi Pn-sequence based compression' algorithms for compressing digital image LSB bit-planes and various lengths of data generated for 3 trials, in accordance with embodiments of the present disclosure. The various images with varying sizes are utilized and the last three bit-planes are used in simulation testing. 'Bit-plane 1' indicates the least significant bit planes and follows. In addition, the simulation results for 3 trials are presented in case of random data since at each trial the randomness of data obtained is different.

TABLE 2

Simulation results using the proposed ('Multi Pn-sequence based compression') algorithm

| Image (size) | Bit-plane1 | Bit-plane2 | Bit_plane3 | Random data length | Trial 1 | Trial 2 | Trial 3 |
|---|---|---|---|---|---|---|---|
| Boy Image (512 × 512) | 0.924 | 0.843 | 0.878 | 31 | 0.87096 (27) | 0.742 (23) | 0.742 (23) |
| River (256 × 256) | 0.859 | 0.891 | 0.913 | 63 | 0.714 (45) | 0.778 (49) | 0.778 (49) |
| Road map (128 × 128) | 0.885 | 0.895 | 0.899 | 255 | 0.745 (190) | 0.729 (186) | 0.761 (194) |

TABLE 3

Simulation results comparison between the proposed algorithm 1 and algorithm 2 and the Run length coding

| Digital media | | Proposed algorithm1 | Proposed algorithm2 | Run length |
|---|---|---|---|---|
| Boy Image (512 × 512) | Bit-plane1 | 0.869 | 0.924 | 1.481 |
| | Bit-plane2 | 0.922 | 0.843 | 1.430 |
| | Bit-palne3 | 0.942 | 0.878 | 1.731 |
| River (256 × 256) | Bit-plane1 | 0.873 | 0.859 | 1.483 |
| | Bit-plane2 | 0.915 | 0.891 | 1.488 |
| | Bit-palne3 | 0.949 | 0.913 | 1.477 |
| Road map (128 × 128) | Bit-plane1 | 0.891 | 0.885 | 1.414 |
| | Bit-plane2 | 0.923 | 0.895 | 1.383 |
| | Bit-palne3 | 0.959 | 0.899 | 1.367 |

Table 3 shows the comparison between the proposed algorithms to the convention run length function. The comparison results prove that the run length algorithm actually needs more memory for storing the data than the actual image. For example, for storing the boy's image bit-plane 1' of size 512 by 512, run length needs a matrix of size 757 by 757 (approximately) where as the proposed algorithm 2 (Multi Pn-sequence based) needs a matrix of size 473 by 473 (approximately), thus showing that the proposed algorithms provide a better compression ratio for random data.

In conclusion, the compression algorithms of the present disclosure, 'Simple Pn-sequence based' and 'Multi Pn-sequence based' have been presented for compressing random data. Steganographic images least significant is of high importance but compressing using lossy algorithms the LSB plane might get lost. The algorithms are effective in compressing the LSB plane data. In addition, the bit-planes are represented with reference to the Pn-sequence thus making the data more random. This is better suited for compression using the proposed compression algorithms. The amount of memory size required for storing the 'Boy image bit-plane 1' with the 'Simple Pn-sequence based' algorithm has a size of about 512 by 512, whereas the run length techniques needs a matrix of size about 757 by 757. The 'Multi Pn-sequence based' algorithm needs a matrix of size 473 by 473 (approximately). In addition, the compression ratio of the algorithms of the present disclosure may be improved by using conventional compression algorithms for bit-planes with high redundancy of the data (such as most significant hit-planes).

T-Order Statistics and Secure Adaptive Steganography

Adaptive steganography is a statistical approach for hiding the digital information into another form of digital media. The goal is to ensure the changes introduced into the cover image remain consistent with the natural noise model associated with digital images. There are generally two classes of steganography—global and local. The global class encompasses all non-adaptive techniques and is the simplest to apply and easiest to detect. The second classification is the local class, which defines most of the present adaptive techniques.

Image steganography is the art of concealing any binary representable digital media into a digital cover image. The information intended to go unseen by intermediate parties is termed the steganographic content. Hidden data formats are to include: audio signals, video files, text documents, as well as other digital images. Currently, steganography techniques can be divided into two distinct classes such as non-adaptive and adaptive methods. Non-adaptive steganography methods are predominantly simple embedding algorithms that at most incorporate a pseudo-random pattern in the embedding of secret information within an image. Such methods belonging to this category are readily available on the internet. WbStego, SecureEngine, and Stool are three of the most commonly referenced and commercially available methods. Embedding approaches such as these make little, if any, acknowledgement to the statistics and visual features associated with the cover image. As a result, the resultant stego image is easily suspected of holding embedded information and very often is susceptible to localization techniques.

The other class of embedding approaches, adaptive steganography, is an ever evolving topic within the scientific field of steganography. There have been numerous adaptive methods proposed over the last few years. Current techniques apply a scanning window measuring local standard deviation. A threshold is set and is the decisive factor in selecting which cover image pixels to use for hiding stego information. A notable limit to the amount of information that may be securely embedded using the given approach is also used.

An alternate image scanning structure using regional segmentation and a complexity measure to adaptively select embedding locations is also currently being used. Additionally, a more intensive approach where considerations are made to retain first and second order statistics is being applied. Histogram frequencies are maintained by modeling the embedding process as a Markov source and modifying the information to be embedded so that it resembles the ideal distribution pertaining to the cover image. There are two limitations generally associated with adaptive embedding techniques: 1) a limited allowable embedding capacity, 2) methods thwarting one type of stego detection tool are vulnerable to another.

The present disclosure provides an adaptive technique that is able to overcome embedding capacity limitations and reduce the revealing artifacts that are customarily introduced when applying other embedding methods. In one respect, a third faction which is the pixel focused class of steganography is used. Applying a new adaptive T-order statistical local characterization, the algorithm may be able to adaptively select the number of bits to embed per pixel. Additionally, a histogram retention process, an evaluation measure based on the cover image and statistical analysis may allow for the embedding of information in a manner which ensures soundness from multiple statistical aspects. Based on the results of simulated experiments, the present disclosure shows how to securely allow an increased amount of embedding capacity, simultaneously avoiding detection by varying steganalysis techniques.

In one respect, a new adaptive embedding technique that has been shown to reduce the probability of detection of steganographic content within digital images. Through directional, local T-order statistical characterization and first order statistical retention, the algorithm may be able to foil steganalysis attempts of different natures and simultaneously increase the allowable embedding capacity. Analysis and guidance are offered by a first-order stego capacity measure (FOSCM) that assists in, for example, the selection of which pixels to use for the embedding of information, the number of pixels to embed per pixel, the selection of which bit layers to hide information, the manner in which to embed information, and/or the selection of a cover image from a database of candidate cover images varying in size, format, and image features.

In other respects, all data acquisition devices incur some level of noise, such as the quantization error introduced by digital cameras. Additionally, the changing frequencies of the color spectrum throughout an image also contribute to the presence of a natural noise level within a digital image. The algorithm may be designed to find locations within an image where these concepts are most prominent. Pixels lying within regions characterized by chaotic variation, not structured variation found in edge pixels, may be identified, and may be further investigated to decide how many bits to embed and which bit layers to use in the embedding process. The algorithm may apply an equivalent amount of analysis in order to enact efforts to retain the first-order statistical structure of the cover image. The fundamental structure of the algorithm can be represented by the block diagram in FIG. 10.

Figure 10:
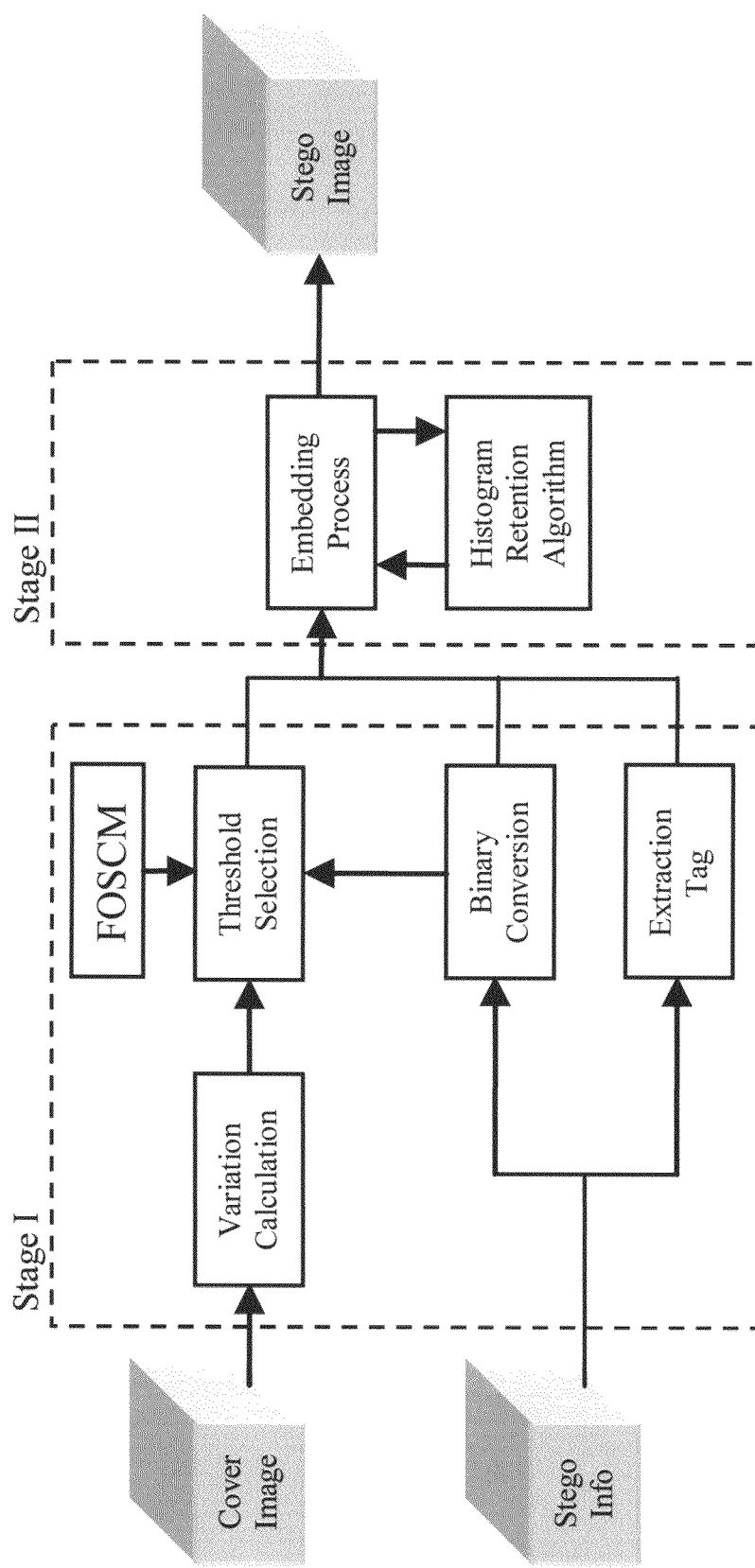
FIG. 10 shows an embedding method, in accordance with embodiments of the disclosure.

Referring to FIG. 10, the algorithm includes several stages producing an elaborate embedding process. In Stage I, development of T-order statistical directional variation and parameter selection process may be preformed. Steps including, but is not limited to, selection of embedding pixels, selection of number of bits per pixel to embed, and selection of which bit layers to embed in may be performed.

In Stage II, a first-order statistical retention may be performed. Steps include, but are not limited to, first-order stego capacity measure computer simulations, analysis, and conclusions.

Stage I—T-Order Statistical Directional Variation Measure and Parameter Selection Process The advantage associated with the new measure is the ability to amplify the level of local variation that is associated with the vicinity of a given pixel. One of the foremost complications involved in the formulation of an adaptive steganographic algorithm is integrating a means for allowing the embedded information to be extracted. Specific pixels may be selected to carry stego information. One commonly applied solution is to remove the influence of any pixels that are to be analyzed from the selection process. If bits are only to be changed in the least significant bit layer, than all bits in that layer may be zeroed out or all set to 1. In this manner, local variation measures may be irrelevant to the least significant bits' contribution to the pixel value. When Investigating this process closer and when considering the insertion of information into multiple bit layers, there may be a resultant color reduction. Zeroing out the entire least significant bit layer converts all odd valued pixels into even ones. The result may be amplified when multiple bit layers are cleared. The benefit of incorporating a T-order statistical analysis may be an amplification of the local noise measurements. T-order statistics add sensitivity to the local variation measures. Removing the affected bit layers removes variation from the original cover image. The purpose of t-order statistical analysis is to offset this fault to reinstate a more accurate calculation of local variation.

In one respect, an image may be scanned by a window of size 3×3, although other dimensions may be used. A small window may ensure that variation calculation is as local as possible giving an accurate characterization of the information within the vicinity of a pixel. A modified variance may be used as a characterization of the variation within the vicinity of a pixel. Instead of using the mean of the acknowledge intensities, a T-order value may be used as a substitute. The associated equation is given below.

$$\eta(i, j) = \frac{1}{N} \sum_{n=1}^{N} (x_n - Torder\{x\})^2, \qquad \text{Eq. 2}$$

where η is the variable assigned to the calculated local median-based variance. The location of the pixel of interest within the image is designated by i and j. The set of pixels within the window is x and N is the total number of pixels within the window. The window size used is a 3×3, where the center value is the pixel for which the variation measure is calculated. A small window may be preferred in order to maintain the absolute locality of the variation measure. It may not be rational to consider a pixel as being within a high variation region when the location of such may be actually three pixels away from an area truly containing a sufficient level of noise. Antonymous may be the minimum restriction of the window size. In order to account for variations in all directions, the specified window size may be used. A 2×2 window would only consider four directions compared to the eight directions included in a window of size 3×3. Additionally, the variation measure of a 2×2 sample space would pertain to a pixel whose location was displaced by half a pixel both horizontally and vertically.

Figure 11:
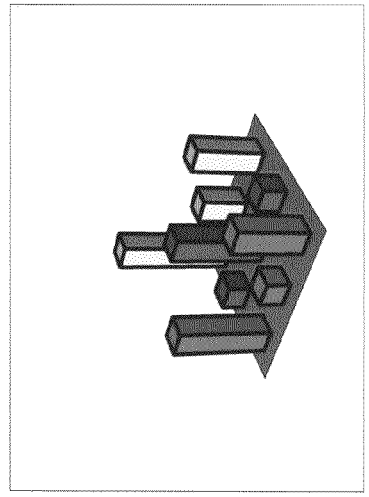
FIG. 11 shows selecting number of bits to embed based on level of variation, in accordance with embodiments of the disclosure.
Figure 11:
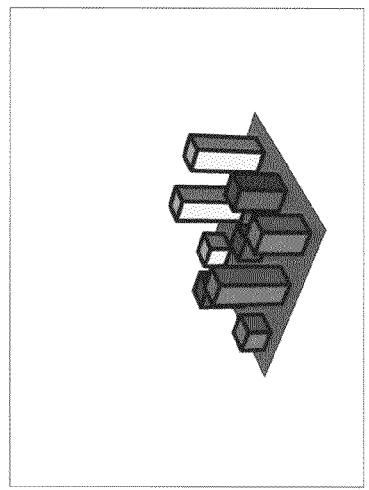
Figure 11:
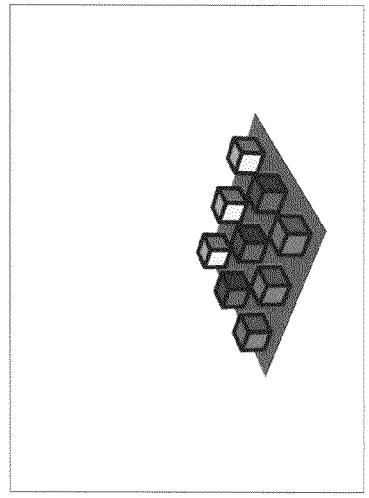

The pixel used for the embedding of stego bits may be defined as the best. If the calculated variation for a particular pixel exceeds the threshold by a determined magnitude, the pixel may be used for the insertion of multiple bits. This principle may be the key factor in the increase in the embedding capacity. In addition, to the increase in embedding capacity, the insertion of multiple bits may also assist in the retention of first order statistics. Embedding multiple bits within a cover image pixel essentially results in a reduced number of pixel values that are altered. Thus, there are fewer modifications to the frequencies in the histograms. FIG. 11 demonstrates the general concept behind the adaptive embedding process.

Furthermore, when multiple bits are inserted into a pixel, the reassigned value may be a non-adjacent value, diffusing necessary adjustments to a further distance. Thus, the random spikes introduced by other methods are beneficially avoided.

A figure displaying the random spikes that occur within the histogram after embedding stego information is given below in FIGS. 12A (a histogram of stego image) and 12B (a histogram of a clear copy image).

Figure 13A:
FIGS. 13A and 13B show results of parameter selection, in accordance with embodiments of the disclosure.
Figure 13B:

The importance of the parameter selection process is to ensure an even distribution of stego information throughout the image, dependant on the size of the stego file that is to be embedded. Neglect of this factor in the embedding process may lead to regions in the image carrying a high density of stego information. Concentrated regions of altered pixels make the stego image susceptible to detection and also simplify any localization attempts. To facilitate extraction, information may be embedded from left to right and from top to bottom. Failure to select the proper parameters is demonstrated below in FIGS. 13A (excessively low parameters) and 13B (adaptive parameter selection).

Selection of the parameters may be dependent on two dictating factors. First, the size of the stego file that is to be embedded in number of bits. The second is the degree of magnitude that separates the single bit embedding threshold from the multi-bit embedding threshold. The relationship between the two thresholds and the number of available pixels may be represented by the equation given below.

$$\Pi = \Delta e^{(-\alpha \tau \chi)} + \beta \qquad \text{Eq. 3}$$

Figure 14:
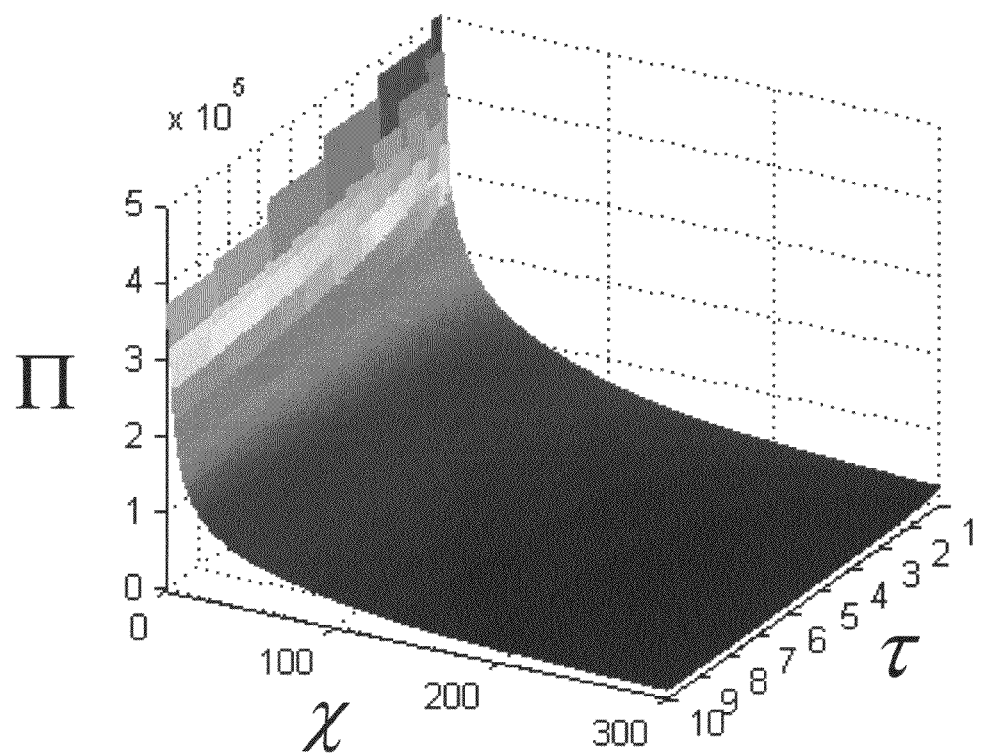
FIG. 14 shows relationship of parameter selection and number of available pixels, in accordance with embodiments of the disclosure.

The number of available pixels $\Pi$ may be found using the exponential function displayed above. $\Delta$ is the total number of pixels in the cover image, $\alpha$ is an image dependent variation factor, $\tau$ is the ratio of the multi-bit threshold to the single bit threshold, $\chi$ is the single hit threshold, and $\beta$ is the number of pixels with no local variation. This relationship is represented by the 3-dimensional graph below shown in FIG. 14.

There are several factors to consider when determining the values of the parameters. From the perspective of $\tau$, which is the ratio of the multi-bit threshold to the single bit threshold, there are benefits and disadvantages to having both a low ratio and a high ratio. Associated with a low value of $\tau$ include more multi-bit carrying pixels, a higher image capacity, a higher root mean square error, and/or a reduced number of changes in first-order statistics. Associated with a high value of $\tau$ include a reduced number of multi-bit carrying pixels, a lower image capacity, a lower root-mean square error, and/or an increase in number of change in first-order statistics The root-mean square error is a measure of how much change was introduced into the image and is one manner of rating the probability of detection. The structure of first-order statistics may also be an important aspect to consider when aiming increasing resistance to detection attacks. A means of selecting the best balance between all the factors to be considered is presented in a following section. Histogram retention is another factor that warrants thorough consideration.

A final procedure to consider is the manner in which to embed the information with focus on a pixel and its associated bit layers. Bits may be inserted as far up as into the third least significant bit layer. Given the proper level of measured variation, the insertion of multiple bits and evidently a greater change in the value of a pixel will not be a cause for risen suspicion.

Stage II—First-Order Statistical Retention

Selecting the proper thresholds may predetermine the locations of every pixel that may be used for embedding stego information and once this has been determined, the image may then be prepared for the second stage of the algorithm. One objective of the second stage is to minimize any changes that must be unfortunately introduced into the image during the embedding process. While the insertion of stego information is taking place, records may be created and updated to remember the actions that have taken place. The focus of these efforts may be to retain the structure of the first-order statistics associated with a cover image. Analysis of first-order statistics is a common approach taken by detection methods and making efforts to maintain these characteristics will assist in evading detection. From FIGS. 12A and 12B, it was shown that embedding information without taking precautions adds random spikes to the frequencies of the histogram. In Stage II, a vector may be created monitoring all pixel value changes. When a pixel is to be changed, the vector may be checked and the possible new values which reflect the required bit/bits are queried. The pixel with the lower associated number in the vector may become the new pixel value. The steps defining this procedure are given below.

In one respect, the technique includes identifying associated bit\bits with current qualified pixel. If the result is identical, there is nothing else to do. If not, find the two nearest pixel values with the required bit\bits. Next, a query data vector for recorded values of two nearest pixels may be performed. A conversion from a pixel to pixel value with the lower associated number may be performed. The vector may be updated by incrementing number for the selected pixel value. Finally, the number associated with original value of the converted pixel is decremented and stego bit with appropriate records update may be outputted.

First-Order Stego Capacity Measure (FOSCM)

The First-Order Stego Capacity Measure may enable an optimal decision in the balance between RMSE and first-order statistics. With this measure, the best cover image for a specific stego file among a database of images varying in size, format, and features. Simultaneously, different existing embedding algorithms to determine the optimal performer may be tested. In order to calculate the FOSCM, a histogram may first be created for the stego image and the original cover image. The following equation is then applied.

$$H = \sum_{k=1}^{K} |x(k) - y(k)|, \qquad \text{Eq. 4}$$

where x and y represent the histograms of the stego and original cover image. K is the total number of possible intensities which for an 8-bit image or color layer is 256. H is simply the sum of all differences introduced by the stego process between the two histograms. Upon derivation of the H value, the FOSCM may be calculated using $$\Omega = \frac{RMSE * H * \lambda}{\Lambda} \qquad \text{Eq. 5}$$

where $\Omega$ represents the FOSCM. The variable $\lambda$ is the number of bits resulting from the conversion of the stego file into binary. $\Lambda$ is the total number of pixels in the cover image. With the calculation of $\Omega$ comes the ability to simultaneously minimize RMSE and altering of first-order statistics.

Computer Simulation and Analysis

Computer simulations can be simulated in MATLAB software package. Raw quick pairs (RQP) and RS-steganalysis detection algorithms may be reduplicated versions of the original algorithms. The various test images used in this analysis are 512×512 color images shown in FIGS. 15A (squirrel), 15B (blue coast), 15C (bluebonnets), 15D (building), 15E (hen and rooster), 15F (Golden Gate Bridge), 15G (fish), 15H (rock), 15I (boy image), and 15J (trolley)

The simulation results show that the presented method is in general immune to LSB detection methods. The 'Ω' for cover image shown in FIG. 15D of size 512×512 for various values of 'T' & various percentages of embedding information are presented in the table 1. The best T-order value for 10% of hidden information into cover of 'Building' is 1. In addition, the best T-order value for 33% of hidden information into cover of 'Building' is 2 and the best T-order value for 33% of hidden information into cover of FIG. 15D is 9.

TABLE 4

'Ω' value for percentages of hidden for cover 'Building' varying T-order values

| Hidden data % | T-order values | | | | | | | | |
|---|---|---|---|---|---|---|---|---|---|
| | 1 | 2 | 3 | 4 | 5 | 6 | 7 | 8 | 9 |
| 10% | 157.83 | 463.49 | 763.66 | 1139.6 | 1229.6 | 1195.6 | 798.69 | 450.22 | 164.63 |
| 33% | 6210.2 | 5897.9 | 6086.4 | 6037.6 | 6012.3 | 6029.5 | 6227.6 | 6112.8 | 6448.3 |
| 50% | 11367 | 11194 | 11601 | 11381 | 11199 | 11521 | 11283 | 11086 | 11059 |

Figure 15C:
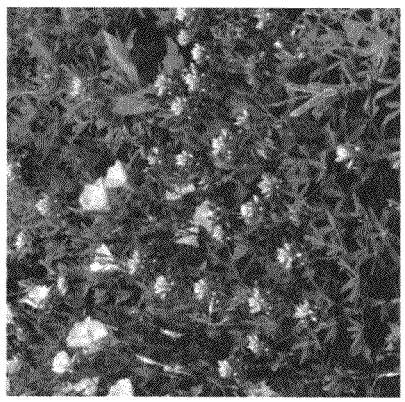
Figure 15B:
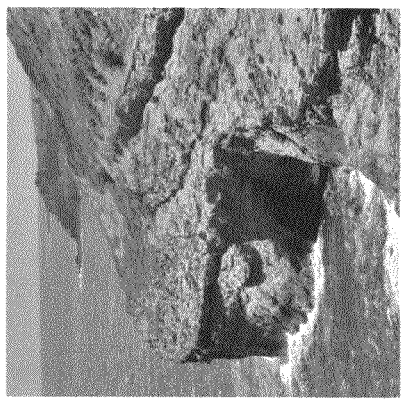
Figure 15D:
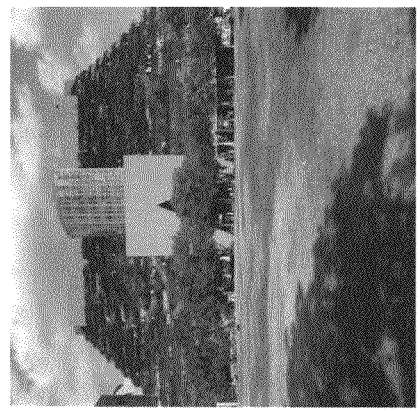
Figure 15A:
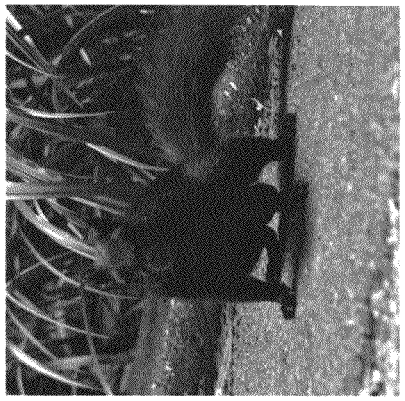

FIGS. 16A and 16B show various 'Ω' value for varying percentages of hidden for cover FIG. 15E with varying T-order values. FIGS. 16A and 16B illustrates the variations in the 'Ω' value for varying percentages (for 10% and 30% of the stego information) is embedded into the cover image. The best T-order value for 10% of hidden information into cover of FIG. 15E is 2. And in case for, the best T-order value for 33% of hidden information into cover of FIG. 15E is 9.

TABLE 5

RQP Steganalysis Attack - Estimated probability of embedded information in each layer
Blue Coast Cover with 50% hidden information

| T-order | Ratio | Reliability Estimation | | | | | |
|---|---|---|---|---|---|---|---|
| | | 0% | 1% | 5% | 10% | 20% | 50% |
| =1 | 0.99836 | 39.42% | 9.53% | 0.16% | 0.27% | 1.39% | 49.22% |
| =2 | 0.99754 | 66.76% | 15.83% | 0.26% | 0.37% | 1.15% | 15.63% |
| =3 | 0.99707 | 74.96% | 17.58% | 0.28% | 0.37% | 0.88% | 5.93% |
| =4 | 0.99788 | 57.07% | 13.65% | 0.22% | 0.35% | 1.31% | 27.40% |
| =5 | 0.99809 | 49.43% | 11.88% | 0.20% | 0.32% | 1.37% | 36.80% |
| =6 | 0.9983 | 41.58% | 10.05% | 0.17% | 0.28% | 1.39% | 46.53% |
| =7 | 0.99766 | 63.79% | 15.17% | 0.25% | 0.37% | 1.21% | 19.21% |
| =8 | 0.99781 | 59.37% | 14.17% | 0.23% | 0.35% | 1.28% | 24.59% |
| =9 | 0.99817 | 46.57% | 11.21% | 0.19% | 0.31% | 1.38% | 40.34% |

To test the security associated with the new proposed algorithm, implementations of RS steganalysis and Raw Quick Pairs (RQP) may be simulated. Table 5 provides the detection results when applying RQP steganalysis for a 'blue coast' cover with 50% hidden information for various t-order values. The results in Table 6 show that in comparison to other embedding techniques, both random and adaptive, the method of the present disclosure is able to avoid detection in all simulations except for one. The clean cover images were also tested to have some manner of control group for comparison with the gathered results.

TABLE 6

RS Steganalysis Attack - Estimated Length of Detected Message

| | Secure Engine | Adaptive | Non-Adaptive | New Method II - No LSB | Clean Images |
|---|---|---|---|---|---|
| Fish 10% | 159 | 1,782 | 5,008 | 238 | 291 |
| Fish 33% | 793 | 11,707 | 12,022 | 170 | 291 |
| Fish 50% | 1824 | 17,105 | 17,596 | 1123 | 291 |
| Gold 10% | 4,419 | 7,125 | 5,129 | 160 | 198 |
| Gold 33% | 16,905 | 7,125 | 12,876 | 181 | 198 |
| Gold 50% | 15,939 | 10,027 | 18,831 | 200 | 198 |
| Rock 10% | 9,947 | 2,585 | 5,209 | 685 | 743 |
| Rock 33% | 15,810 | 12,800 | 12,675 | 689 | 743 |
| Rock 50% | 11,782 | 18,472 | 17,935 | 635 | 743 |
| Boy Image 10% | 1,655 | 808 | 3,346 | −518 | −472 |
| Boy Image 33% | 2,845 | 10,378 | 10,692 | −456 | −472 |
| Boy Image 50% | 3,072 | 15,248 | 16,724 | −393 | −472 |
| Trolley 10% | 1,631 | 1,676 | 4,641 | −18 | −46 |
| Trolley 33% | 12,060 | 9,519 | 12,475 | 69 | −46 |
| Trolley 50% | 16,821 | 13,949 | 17,394 | 306 | −46 |

The above provides an adaptive method of steganography that successfully reduces the probability of detection while simultaneously allowing a higher image capacity when compared to other adaptive embedding techniques such as the algorithms presented by Fridrich and Rui as well as existing random embedding methods. This may be accounted to the incorporation of t-order statistics in order to improve upon the sensitivity of the local variation measure calculations to offset the resolution reduction caused by the removal of bit layer information. Using the adaptive multi-bit principle, more information is able to be inserted which has the additional benefit of reducing the necessary changes of necessary first-order statistics as a result of utilizing a reduced number of cover image pixels. Additionally, the adaptive assignment of the threshold in order to allow for an ideal distribution of stego information throughout the image further assists in the decreasing in the risk of detection. Finally, by incorporating a concept presented by Franz, we successfully resist the changing of first-order statistics thwarting any histogram based steganalysis attacks. Figures showing the histograms of outputted images demonstrate the reduction in identifiable artifacts commonly introduced by the embedding process. As an added feature, a First-Order Stego Capacity Measure (FOSCM) has been provided which optimizes the balance between RMSE and disturbances of first-order statistics.

Adaptive Steganography with Increased Embedding Capacity for New Generation of Steganographic Systems Adaptive steganographic techniques have become a standard direction taken when striving to complicate the detection of secret communication. The consideration of cover image features when embedding information is an effort to insert digital media while keeping the visual and the statistical properties of the cover image intact. There are several such embedding methods in existence today, applicable for different formats of images and with contrasting approaches. In this disclosure, a new adaptive embedding technique which alters the least significant bit layers of an image. This technique is driven by three separate functions: 1) adaptive selection of locations to embed; 2) adaptive selection of number of bits per pixel to embed; and 3) adaptive selection of manner in which the information is inserted. Through the application of sensitive median-based statistical estimation and a recorded account of actions taken, the algorithms may be able to provide the desired level of security, both visually and statistically. In comparison with other methods offering the same level of security, the new technique is able to offer a greater embedding capacity. In addition, for the sake of thorough investigation and fair comparison, a new stego capacity measure which will offer a means of comparing steganography methods applied across different formats of images. Finally, this new algorithm is created with the intention of implementing within the offered capabilities of a wireless mobile device.

In one respect, a new adaptive embedding technique that has been proven to minimize the detection of steganographic media within digital images is provided. Through the application of sensitive median-based statistics, the algorithms may be able to provide a sound level of security while simultaneously increasing image capacity. Analysis is assisted by the use of a new stego capacity measure which offers insight to the relationship between capacity and image modification. Through this measure, the best candidate may be chosen to cover from a database of images with varying sizes, formats, and features.

Figure 17:
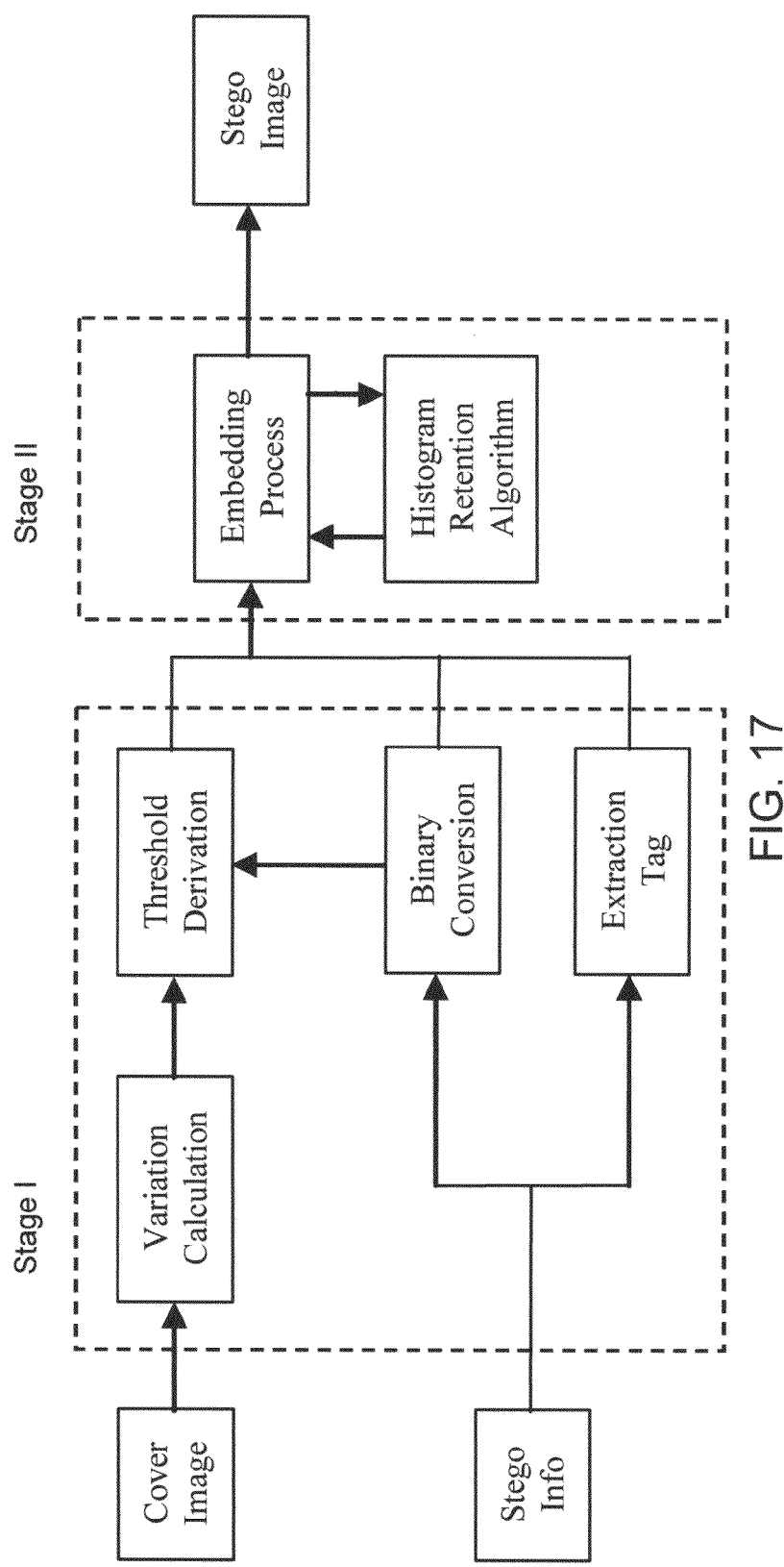
FIG. 17 shows an embedded method, in accordance with embodiments of the disclosure.

Information to be embedded may be either done by changing coefficients in the transform domain or, in one embodiment, remaining in the spatial domain and altering the least significant bits of the binary representation of a digital image. The proposed LSB embedding algorithms take advantage of the uncertainty and noise like properties that are associated with certain regions within a candidate cover image. All data acquisition devices, such as digital cameras, incur some level of noise. The changing frequencies of the color spectrum over an image also imitate noise like qualities. The ability to successfully identify regions of an image where this idea is prominent may ensure the failure of detection software attacks. The algorithms for this new adaptive approach are derived from noise identification algorithms proposed by Agaian, Sifuentes, and Lamoroueux. These algorithms use detection measures with increased statistical sensitivity to successfully separate noisy pixels from those naturally associated with the image. Detailed characterization of the surroundings of a pixel give an idea of the best approach, and the amount of information that can be safely embedded at a given pixel location. Additionally, the second stage of the embedding process applies an equal amount of evaluation in working to counteract the revealing statistical artifacts that are introduced from the insertion of stego information. The basis structure of the algorithm is represented by the block diagram in FIG. 17. The presented method may be subdivided into two systems.

Again, the capability of applying fast algorithms and using fixed memory partitions in order to develop a new system for the implementation of steganographic programs is provided. Though steganography is traditionally accomplished using the high processing speeds of a desktop or even notebook computer, recently technology has miniaturized high complexity circuitry giving rise to the convenience of portable and complex processing components. Such advancements are clearly demonstrated in the field of wireless communications. Mobile devices are continuously increasing in the level and quality of services and applications that are offered. With the introduction of mobile platform operating systems, there arises the opportunity to create and develop innovative translations of commonly used processes.

The algorithm includes several stages producing an elaborate embedding process. System I may be used for the development of variation measures and explanation of the threshold derivation process including selection of best locations to embed and/or selection of number of bits per pixel to embed. System II may execute a histogram retention algorithm and embedding process. The algorithm may also include a First-Order Stego Capacity Measure (FOSCM), computer simulations, and/or analysis. Analysis may be done using a database of 100 color and 100 grayscale bitmap images varying in size, color, and classes of image features. Stego files of different size and format may be also used to demonstrate their affects on the detection process. In comparison to the readily available embedding software as well as other existing adaptive embedding methods, the present disclosure's method is shown to perform quite well in maintaining a resistance to detection as well as enabling an increase in the amount of stego capacity. Detection tests were done using implementations of RS Steganalysis and Histogram Quick Frequency.

System I—Variation Measures and Threshold Derivation Process

Figure 18A:
FIGS. 18A and 18B show noise detection, in accordance with embodiments of the disclosure.
Figure 18B:

The primary function of the variation measures may be to form a foundation for the adaptive selection of embedding locations and the number of bits per pixel to embed. This measure may be used as an integral component to the noise detection algorithms. Fundamentally, the objective is to modify the cover data to reflect the binary information to be hidden while ensuring that changes do not exceed the noise threshold. Algorithms intended for the detection of noise corrupted pixels may simply tuned down to the level of detecting natural image noise. FIGS. 18A (image corrupted with Gaussian Noise) and FIG. 18B (clean image) demonstrates the detection of noise both in an image corrupted with Gaussian noise and a clean image.

Pixels considered noisy are represented in gray and edge pixels may be designated in black. Edge pixels also have noise-like characteristics and as a result, may be included for considerations of noise. The clean image with corrupted pixels identified demonstrates the presence of natural noise.

Median-Based Variance as a Variation Measure

The measure we use as a characterization of the variation within the vicinity of a pixel is a modified variance. Instead of using the mean of the acknowledge intensities, we substitute the median value. The associated equation is given below.

$$\eta(i, j) = \frac{1}{N}\sum_{n=1}^{N} (x_n - \text{median}\{x\})^2, \qquad \text{Eq. 6}$$

where η is the variable assigned to the calculated local median-based variance. The location of the pixel of interest within the image is designated by i and j. The set of pixels within the window is x and N is the total number of pixels within the window. The window size used in this application is a 3×3, where the center value is the pixel for which the variation measure is calculated. A small window may be preferred in order to maintain the absolute locality of the variation measure. In one embodiment, it may not be rational to consider a pixel as being within a high variation region when the location of such is actually three pixels away from an area truly containing a sufficient level of noise. Antonymous is the minimum restriction of the window size. In order to account for variations in all directions, a specified window size may be used. A 2×2 window would only consider four directions compared to the eight directions included in a window of size 3×3. Additionally, the variation measure of a 2×2 sample space would pertain to a pixel whose location was displaced by half a pixel both horizontally and vertically.

Selecting Best Locations to Embed Information and Adaptive Multi-Bit Embedding

The determination of the variation measure pertaining to each pixel enables the algorithm to select at which locations would be best to insert information. If the local measures exceed a certain threshold level, the pixel may be deemed as a suitable candidate for the insertion of binary data. If the variation measure is found to exceed the threshold by a determined magnitude, the pixel may facilitate the hiding of multiple bits. This adaptive selection of how many bits per pixel to embed is the foundation of the increased capacity the proposed algorithm is able to offer. Under certain conditions, the noise level at a designated region may be sufficiently high to allow a greater level of modification to the value of a pixel. FIG. 11 demonstrates the general concept behind this process.

Aside from the benefit of an increase in cover image capacity, the idea of embedding multiple bits per pixel also assists in the retention of first-order statistics. Since fewer pixels are modified, there may be a reduced number in modifications of frequencies in the histograms. Furthermore, when embedding multiple bits, often the pixel may be reassigned a value other than the adjacent intensity. Necessary adjustments are diffused at a further distance, counteracting the random spikes that often occur within the histogram with various other techniques. Thus, the increased embedding capacity property is also inherent in the decrease in probability of detection of steganographic activity.

For a given example, a 512×512 grayscale image may be used as the cover media. Stego information was hidden in approximately 75% of the pixels in the cover image. A high percentage of embedded information may be inserted to make the random spikes more visually prominent. The statistical analysis is much more sensitive to histogram frequency characteristics than what is able of the human visual system.

$$RMSE = \frac{1}{N}\sum_{i=1}^{N} |x(i) - y(i)|^2. \qquad \text{Eq. 7}$$

There are benefits to be realized through the application of multiple-bit embedding, but there is also a balance which must be considered. Overuse of the multi-bit embedding concept may dramatically increase the amount of root-mean-square error (RMSE) introduced into the image during the embedding process. A reduced number of pixels may be altered, but a multitude of pixels may altered by a value greater than one. RMSE may be derived from Eq. 7.

Adaptive Threshold Derivation Process

Figure 19A:
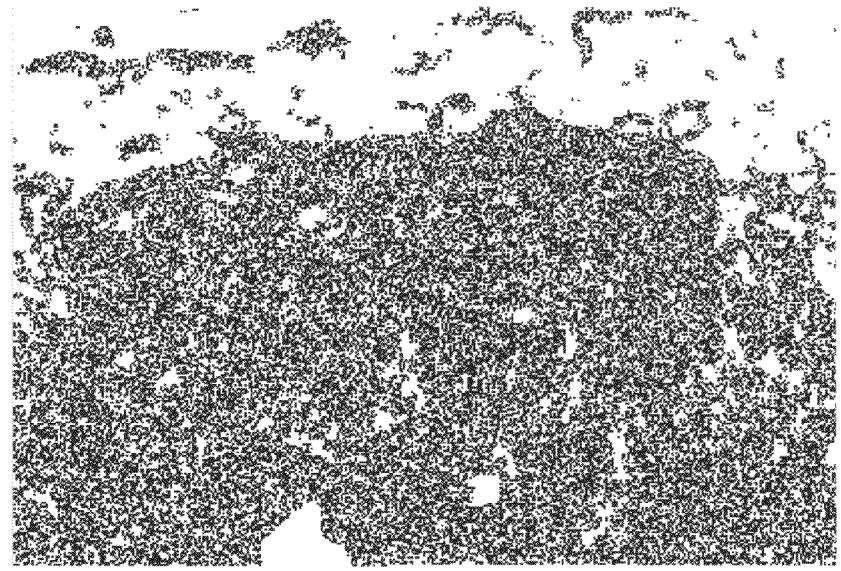
FIGS. 19A and 19B show threshold level settings, in accordance with embodiments of the disclosure.
Figure 19B:

The purpose of the threshold derivation process may be to ensure an even distribution of stego information throughout the image. This process selects the threshold in a manner in which the safest pixels may be used first in relevance to the size of the stego file to be embedded. To facilitate extraction, information may be sequentially embedded from left to right, top to bottom. If the threshold is randomly selected, one may be unsure of the resultant distribution of steganographic data. A very high threshold may not accommodate the amount of space required. Setting the threshold excessively low may result in a higher than necessary density of modified pixels. FIG. 19A (excessively low threshold) and FIG. 19B (adaptive threshold selection) provide an example demonstrating the importance of selecting the proper threshold. Stego containing pixels are represented in black.

Figure 20B:
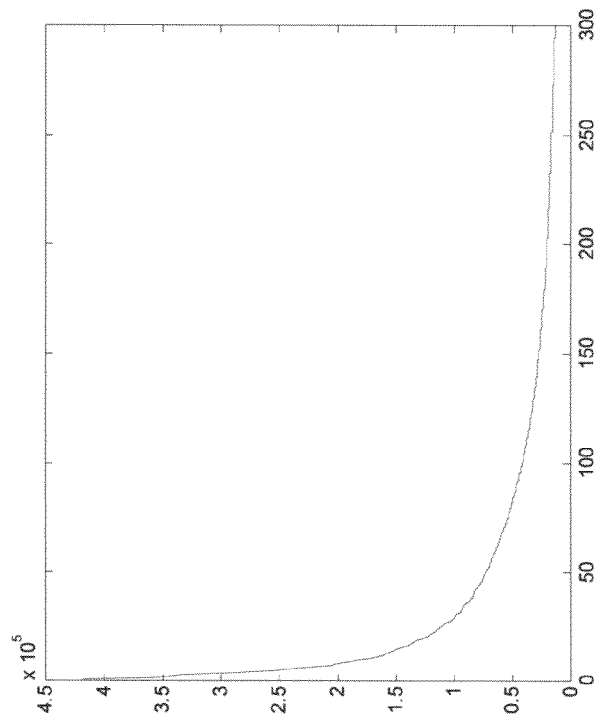
FIGS. 20A and 20B show exponential relation between threshold and available pixels, in accordance with embodiments of the disclosure.

The decision of the threshold may be dependant of two variables: the amount of data that is to be inserted, and the magnitude of the difference in thresholds distinguishing single and multi-hit carrying pixels. The relationship between the number of candidate pixels and the threshold value is an exponential function as is displayed in FIGS. 20A and 20B.

Figure 20A:
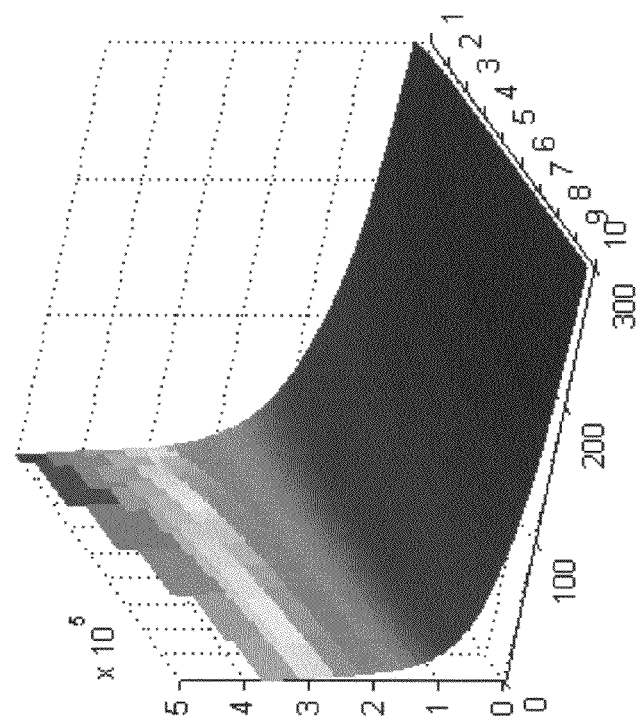

The Z axis of the left graphic in FIG. 20A represents the number of pixels that qualify for stego insertion based on a particular threshold value. The Y axis in the left graphic represents the ratio between the single-bit and multi-bit thresholds. The greater the value of this ratio, the sharper the knee in regards to the exponential function. The importance of the incline may be its determination in the level of control over the number of available pixels. Little control results in a reduced ability to find an optimal distribution for stego information. Additionally, a higher ratio may reduce the allowable image capacity and degrade the effectiveness of the multi-bit principle. However, there is an indirect relationship between the ratio and the RMSE value. A higher ratio corresponds to a lower resultant error value. A low ratio results in a smooth and higher curve offering greater control of stego distribution and an increased embedding capacity. The associated negative factor may have an increase in the RMSE value, somewhat contributing to the risk of detection. The decisive factor in the selection for the optimum balance may be the effects of the selected parameters on first-order statistics and a measure for making such decisions is presented in a following section. Associated, histogram retention may be a significant factor crucial to the performance of the proposed algorithm.

System II—Histogram Retention Algorithm and Embedding Process

The selection of the threshold and applied ratio predetermines every location for the insertion of stego information. All the functions of System I may be a required preliminary for the second system. The purpose of histogram retention may be an effort to preserve first-order statistics. Natural digital images may generally produce a smooth histogram, characterized by gradual fluctuations throughout the entire intensity spectrum. As displayed in the previous example presented, steganographic processing has the effect of disrupting this expected behavior. The goal of histogram retention is to minimize this affect and maintain the natural appearance of statistical properties of the image. In order to accomplish this, we create a vector that records all applied pixel modifications. If the opportunity arises to counteract a previous modification, the algorithm may recognize such and enact the rectification. The histogram retention efforts may occur simultaneously with the embedding process. The data vector may be iteratively queried and updated with each transformed pixel. The general procedure of this process is accomplished by applying the following steps to the histogram retention algorithm.

In one embodiment, values of next bit\bits to be embedded may be inputted. Next, an identification step identifying associated bit\bits with current qualified pixel, and if the comparison shows that qualified pixel and bit\bits are identical, there are no further actions to be taken. If the comparison shows that they are not identical, the two nearest pixel values with the required bit/bits may be found. A query data may be used for recording the values of the lower associated number and a vector may be updated by increment number for the selected pixel value. The original value of the converted pixel may be updated by incrementing an update vector. Next, the original value of the converted pixel may be decreased.

First-Order Stego Capacity Measure (FOSCM)

The First-Order Stego Capacity Measure enables an optimal decision in the balance between RMSE and first-order statistics. With this measure, \ the best cover image for a specific stego file among a database of images varying in size, format, and features may be found. Simultaneously, different existing embedding algorithms to determine the optimal performer may be tested. In order to calculate the FOSCM, a histogram must first be created for the stego image and the original cover image using, for example, Eq. 4. Upon derivation of the H value, the FOSCM may be calculated using, for example, Eq. 5. With the calculation of $\Omega$ comes the ability to simultaneously minimize RMSE and altering of first-order statistics.

Computer Simulation

Computer simulations were simulated in the MATLAB software package. Initial tests were intended to analyze the histogram differences introduced by three different adaptive embedding algorithms. The first method is from the referenced article by Fridrich and Rui. This method may use a normal variance to determine variation measures associated with each pixel. For fair comparison, an optimal threshold derivation for an even distribution of steganographic information may be used.

Figure 21B:
FIGS. 21A and 21B show test image, in accordance with embodiments of the disclosure.

The second method includes an adaptive, multi-bit capability method without histogram retention processing and the third is our fully adaptive algorithm with histogram retention. The test images used in this analysis are the 512×512 grayscale images displayed in FIG. 21A (fisherman sign) and FIG. 21B (Trolley).

Figure 22:
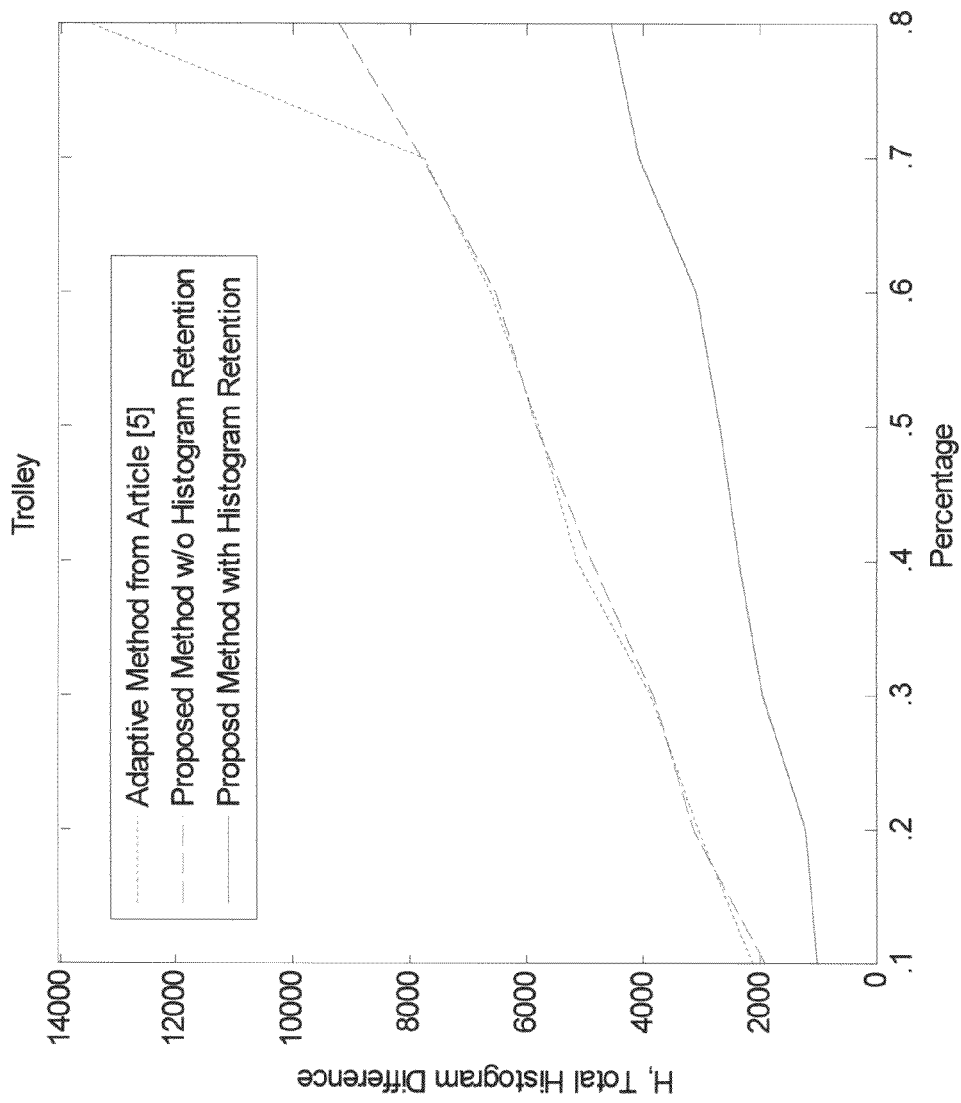
FIG. 22 shows a plot of histogram difference using adaptive embedding methods, in accordance with embodiments of the disclosure.

Incremental sizes of stego files may be embedded using each method and the associated H values are plotted in FIG. 22. The X axis in of the figure represents the ratio of number of bits resultant of the binary conversion of the stego data to the number of pixels in the cover image. Percentages from 10% to 80% in increments of 10% were introduced into the cover image. The Y axis of FIG. 22 represents the sum of the magnitude differences between histograms of the original and stego images. The resultant values for each percentage of embedding are represented by three distinguishably formatted plots. The proposed method proves to give the lowest level of histogram modification in comparison to the other adaptive methods. The random embedding method SecurEngine, was excluded from this simulation to reduce graphical clutter but will be acknowledged in the following example to demonstrate its associated deficiencies in comparison to the adaptive methods.

Figure 21A:

The second example shows the magnitude of the difference for each particular intensity frequency in relation to the original and stego images. The number of bits embedded is 10% of the number of pixels in the cover image. These plots are from steganography embedded into the fishermen test image (FIG. 21A). In FIG. 23A, a proposed histogram is shown. In FIG. 23B is an adaptive method from current technologies. In FIG. 23C is a proposed method without histogram retention. In FIG. 23D is a histrogram from SecurEngine.

Figure 24C:
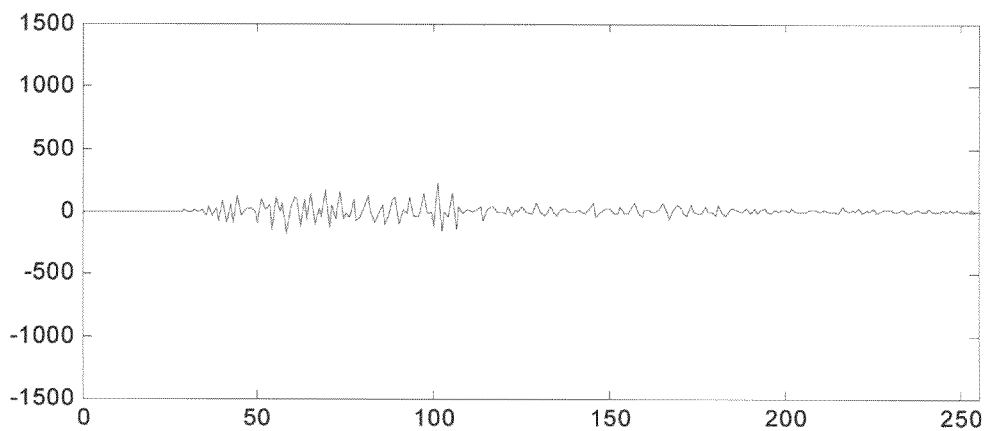
Figure 24D:
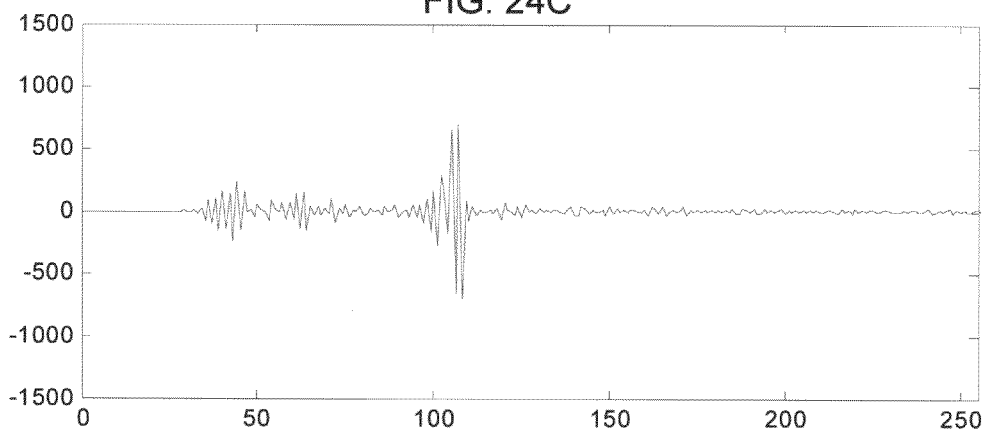

In the following histograms, the amount of stego information with up to 80% of the number of pixels in the cover image is tested. The resultant plots are presented in FIG. 24A, a proposed histogram is shown, in FIG. 24B is an adaptive method from current technologies, in FIG. 24C is a proposed method without histogram retention, and in FIG. 24D is a histrogram from SecurEngine.

Figure 25A:
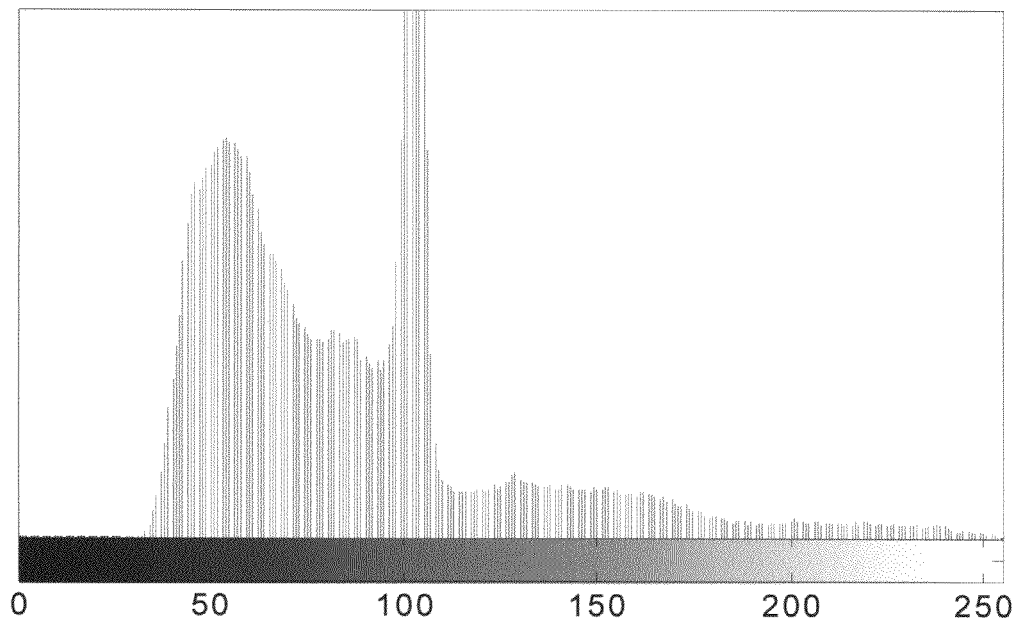
FIGS. 25A and 25B show histograms, in accordance with embodiments of the disclosure.
Figure 25B:
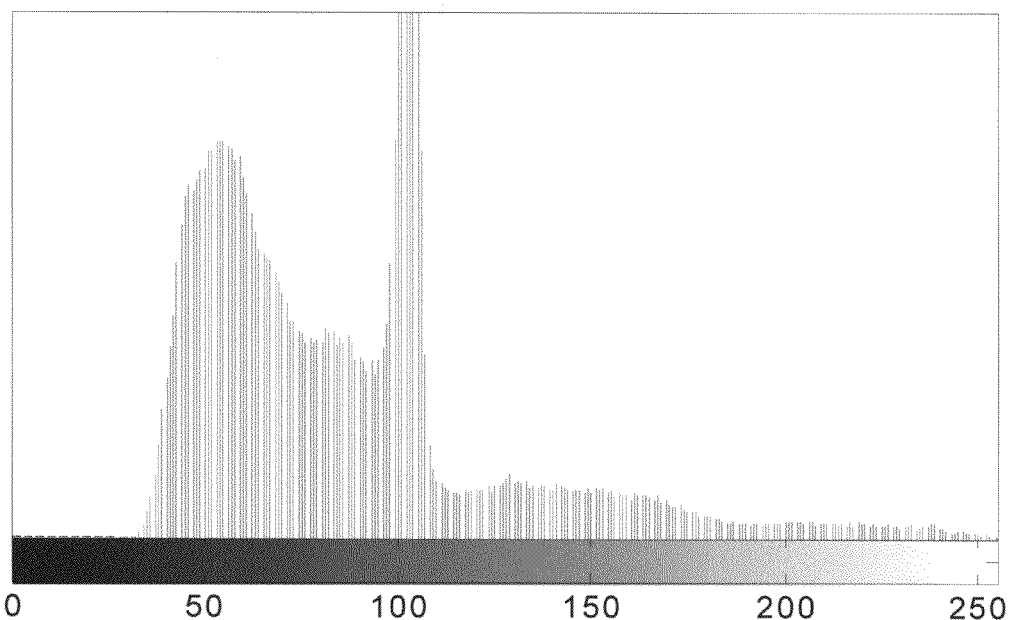

In combination with the example above, the histograms of the stego image using the proposed method and the stego image using the simple adaptive algorithm by Fridrich and Rui are compared to the histogram of the original image in FIGS. 25A (histogram of a cover image) and 25B (histogram of stego image with best threshold). These histograms, excluding the original cover image, may be embedded with an amount of bits approximately equivalent to 80% of the number of pixels in the cover image.

Figure 26A:
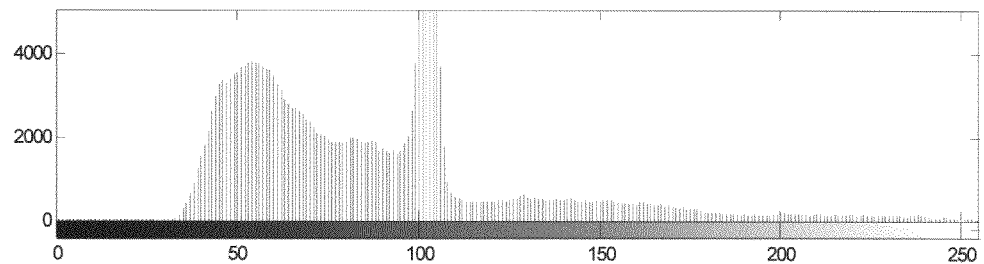
FIGS. 26A through 26C show comparison histograms after embedding of 80%, in accordance with embodiments of the disclosure.
Figure 26B:
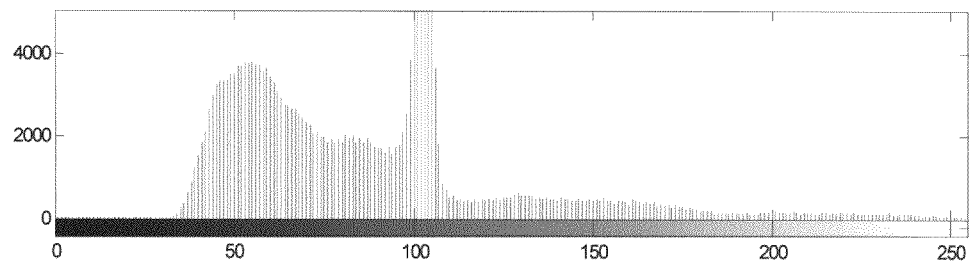
Figure 26C:
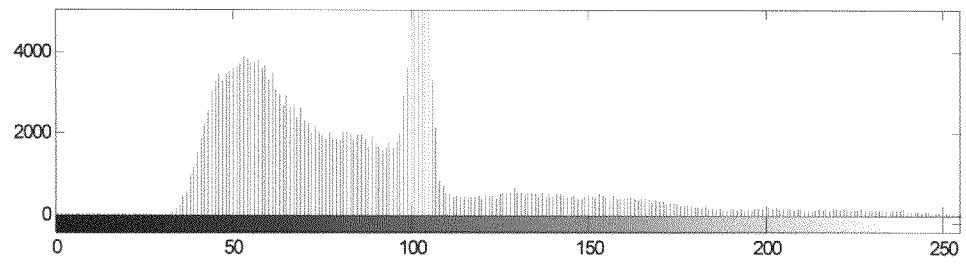

The final example expresses the extent to which we may embed information and not noticeably alter the ideal histogram. In summary, there is an associated capacity with this permitted boundary. This boundary may be relevant to the region preceding the knee of the exponential function showing the relationship between the threshold and the number of qualified pixels associated with that particular threshold. The optimum secure capacity may be attained by constraining the threshold in the region directly prior to the point in which control of distribution becomes unstable. In relation to the curve on the left of FIG. 14, this region would lie in the threshold range from approximately 50-60. FIG. 26A (original image histogram), 2613 (histogram of image after methods of the present disclosure), and 26C (histogram using referenced adaptive method) show the histogram when the threshold is assigned within this region.

Figure 27:
FIG. 27 shows a table calculation of FOSCM measure to find a best coverage image, in accordance with embodiments of the disclosure.
Figure 27:
Figure 27:
Figure 27:
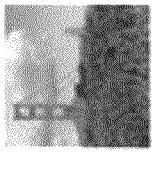

Through the use of the FOSCM, the best image for embedding a particular stego file may be selected. FIG. 27 shows the calculated FOSCM values associated with embedding the file into the five test images. The image pertaining to the lowest FOSCM measure is the best image to use as the cover for the specified stego. For this particular test stego file, the best cover image was determined to be the chess match image ($4^{th}$ column).

To further test the security associated of the algorithm, implementations of RS steganalysis and Histogram Quick Frequency was tested. Table 7 gives the detection results when applying RS steganalysis. RS steganalysis is well known to detect even very small stego messages. Given is the detected message length in terms of bytes. 10% pertains to a message length of 3,249. 33% pertains to a message length of 10,816 and 50% pertains to a message length of 16,384.

TABLE 7

RS steganalysis attack - Estimated Length of Message in Number of Bytes

| | SecurEngine | Adaptive [5] | Non-Adap. [5] | New Method |
|---|---|---|---|---|
| Fish 10% | 159 | 1,782 | 5008 | 379 |
| Fish 33% | 793 | 11,707 | 12,022 | 624 |
| Fish 50% | 1824 | 17,105 | 17,596 | 730 |
| Gold 10% | 4,419 | 7,125 | 5,129 | 76 |
| Gold 33% | 16,905 | 7,125 | 12,876 | 185 |
| Gold 50% | 15,939 | 10,027 | 18,831 | 361 |
| Rock 10% | 9,947 | 2,585 | 5,209 | 805 |
| Rock 33% | 15,810 | 12,800 | 12,675 | 934 |
| Rock 50% | 11,782 | 18,472 | 17,935 | 1197 |

TABLE 7-continued

RS steganalysis attack - Estimated Length of Message in Number of Bytes

|  | SecurEngine | Adaptive [5] | Non-Adap. [5] | New Method |
|---|---|---|---|---|
| Sarkis 10% | 1,655 | 808 | 3,346 | −288 |
| Sarkis 33% | 2,845 | 10,378 | 10,692 | 78 |
| Sarkis 50% | 3,072 | 15,248 | 16,724 | 639 |
| Trolley 10% | 12,060 | 1,676 | 4,641 | 219 |
| Trolley 33% | 16,821 | 9,519 | 12,475 | 711 |
| Trolley 50% | 1,631 | 13,949 | 17,394 | 1035 |

TABLE 8

Histogram Quick Frequency Attack

|  | SecurEngine | Adaptive [5] | Non-Adap. [5] | New Method |
|---|---|---|---|---|
| Fish 10% | N | N | N | N |
| Fish 33% | Y | Y | N | Y |
| Fish 50% | Y | Y | Y | Y |
| Gold 10% | N | N | N | N |
| Gold 33% | Y | N | N | N |
| Gold 50% | Y | Y | Y | N |
| Rock 10% | N | N | N | N |
| Rock 33% | N | N | Y | N |
| Rock 50% | Y | Y | Y | N |
| Sarkis 10% | Y | Y | Y | N |
| Sarkis 33% | Y | N | Y | N |
| Sarkis 50% | Y | N | N | N |
| Trolley 10% | Y | Y | N | N |
| Trolley 33% | N | N | Y | N |
| Trolley 50% | N | Y | Y | N |

The above tables were tested using 8-bit grayscale images with dimension 512×512. The RS Steganalysis generally failed to detect the level of information that was actually embedded but succeeded in detecting for almost all other methods of steganography. Similarly, histogram quick frequency detected stego in the new method in the fewest number of trials. Outperformed were SecurEngine, an adaptive method and a random method.

We have presented an adaptive method of steganography that successfully reduces the probability of detection while simultaneously allowing a higher image capacity when compared to other adaptive embedding techniques such as the algorithms presented by Fridrich and Rui as well as existing random embedding methods. Using the adaptive multi-bit principle, more information can be inserted which has the additional benefit of reducing the necessary changes of first-order statistics as a result of utilizing a reduced number of cover image pixels. Additionally, the adaptive assignment of the threshold in order to allow for an ideal distribution of stego information throughout the image further assists in the decreasing the risk of detection. Finally, by incorporating a concept presented by Franz, a first-order statistics thwarting any histogram based steganalysis attacks were not changed. Figures showing the histograms of outputted images demonstrate the reduction in identifiable artifacts commonly introduced by the embedding process. As an added feature, we have introduced the First-Order Stego Capacity Measure (FOSCM) which optimizes the balance between minimizing RMSE and disturbances of first-order statistics. Finally, these algorithms have been formulated in a manner that will accommodate the implementation of such a system within the capabilities of the technology offered by the latest wireless mobile devices. These ideas are currently being further developed to facilitate the transition of created algorithms into the new environment.

Palette-Based Steganography Used for Secure Digital Image Archiving

This section focuses on essential problems faced in digital image archiving. One of the principal objectives is to preserve secure digital media and information for the future. In addition to identifying file formats where storage systems and current technology are still in their infancy research is the key component in maturing these systems. Furthermore, with developing new generation of archiving system, there is a need to have a high capacity embedding methods. The present disclosure stores digital image content within a secure storage preserving the content without allowing an unauthorized third party the ability to view the content even in the event that the security is breached. A new secure high capacity embedding method may be used in a secure multilayer database system for digital image archiving. This steganographic approach has the following advantages: 1) BPCS Steganographic method for palette-based images; 2) provides additional security through a simple selective color and cover image algorithm; 3) provides the closest color substitutes using a weighted distance measure; 4) offers an increased capacity by embedding in N×M blocks sizes; and 5) the secure media storage system contains an independent steganographic method that provides an additional level of security.

There are several algorithms that are used to embed information in cover images. These algorithms use inconspicuous looking carriers that take advantage of the gaps in the human visual and audio systems to hide information. Digital images contain considerable amounts of redundant data; therefore they are ideal carriers used to conceal the presence of secret information. There are many color models used to represent digital images and all of them can be modified to embed information. The most popular color models used for this purposes are the 24-bit RGB or "true-color format" and palette-based color format. True-color images are composed of three layers, corresponding to the primary colors: Red, Blue, and Green. Each color layer is represented using 8-bits for true-color images. Palette based images on the other hand, are represented using an index and a palette. The palette contains all the image's colors while the index contains only addresses that point to a specific location in the palette.

Problems with existing palette steganographic methods are that the information is limited and the hidden message can be destroyed by switching the order of the palettes. In this disclosure, a palette-based steganographic method with increased security and embedding capacity is provided.

Another area of interest is the capacity that digital media can handle before visual and statistical artifacts cause degradation to the cover file. Many steganographic capacitates have been proposed to improve both steganographic embedding and detection processes within media files. Several authors consider capacity from the communications point of view, or consider the capacity as the value of a mutual-information game between the data hider and the attacker, for example 1) data hiding capacity has been calculated as the capacity of the Gaussian channel; 2) the capacity of the data hiding channel has been regarded as intentional jamming for the source of noise; 3) a comprehensive model is described, which analyzes the performance of a proposed scheme for data hiding; 4) estimates data-hiding capacity has been estimated as a maximum rate of reliable transmission, for host-image sources; 5) a theoretic approach has been presented which obtains an estimate of the number of bits that can be hidden in still images, or the capacity of the data-hiding channel; and 6) estimated boundaries have been calculated for steganographic-communication channel capacity.

The method of the present disclosure may be applied to a secure multilayer database system for digital image archiving. This disclosure discusses the necessary background for bit plane complexity measure and the bit plane stego sensitivity measure used for image capacity. Palette based bit plane steganography is described in the third section followed by the computer simulation.

Bit Plane Complexity Measure

This section will introduce some necessary definition needed for the derivation of the stego sensitivity measure and investigation of some measurement properties.

Masks:

Let $$M_{R,C} = \begin{bmatrix} \square & \cdots & \square \\ \vdots & \ddots & \vdots \\ \square & \cdots & \square \end{bmatrix}$$

be any mask at R, C pixel location. The number of adjacent pixels surrounding a center pixel at the pixel location may be denoted R, C. The binary pixels compared are $|P_{R,C} - R_{R-1,C}| < 1$, defined by the mask used and block size. Unlike the complexity measure defined for a given 8-bit color layer, the pixels for each bit plane decomposition may have a difference of less than one. β is an incremental count of the adjacent pixel comparisons that meets the given threshold of one, and $\beta_{max}$ is the maximum number if all adjacent pixel comparisons meet the threshold within a block size and a moving mask. The same pixels may not to be compared. Other masks as defined in the original complexity measure may be used as well.

Bit Plane Stego Sensitivity Measure

Let I be an image of size $N_1 \times N_2$, and let $I_B$ be the bit plane decomposition of an 8-bit color layer. Each of the decomposed bit planes may be divided into blocks, sub bit planes, of $M_1 \times M_2$ from the image $I_B$. Then the pixel comparison based complexity measure for bit plane is defined as:

$$\gamma, (m, n) = \frac{\beta}{\beta_{max}}. \quad \text{Eq. 8}$$
$$i = 0, 1, \ldots, 7,$$

where m and n are the block locations being analyzed and i defines the bit plane layer. Each of the bit planes are scanned individually for ideal regions of embedding.

Stego Sensitivity Measure for an individual bit plane is defined by:

$$\Gamma_i = \frac{1}{MN} \sum_{m=1}^{M} \sum_{n=1}^{N} \gamma_i(m, n). \quad \text{Eq. 9}$$
$$i = 0, 1, \ldots, 7,$$

where $\gamma_i(m,n)$ are the block values containing all of the complexity values within the image bit plane, N is the number of rows in Γ and M is the number of columns in Γ. Non-zero values are not stored to derive a true threshold for the bit plane.

The general algorithm for calculation of bit plane stego sensitivity measure includes inputting an image of any size to be analyzed for embeddable regions. The image may be divided into color layers followed by a bit plane decomposition step. Next, a block size is determined and the bit plane is divided into analyzed sections. A mask size may be decided. The value of γ for each block may be calculated ensuring the blocks overlap. An initial value for the threshold of Γ may be calculated. Next, γ is determined to see if its value meets the threshold and categorize γ is into embeddable regions. Rows and column location of the embeddable region may be outputted.

Figure 28:
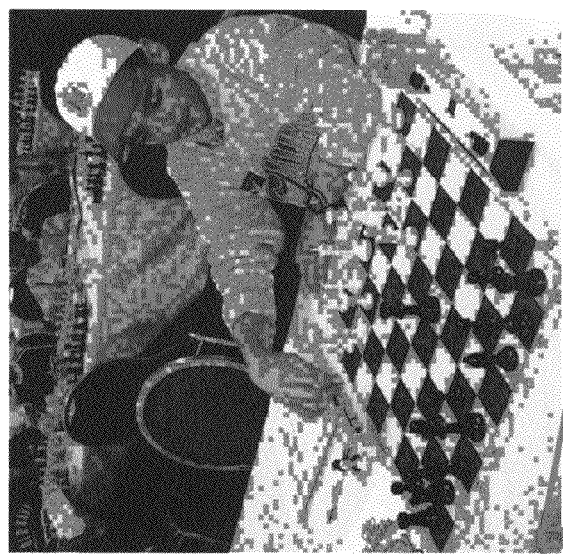
FIG. 28 show embeddable areas within an image and a detailed view of allowable altered bits (highlighted) within a block. The left thumbnail shows the natural block and the right shows the highlighted areas, in accordance with embodiments of the disclosure.
Figure 28:
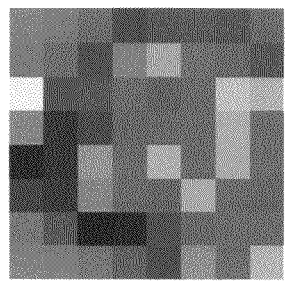
Figure 28:
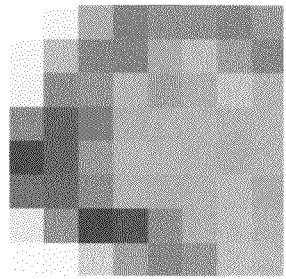
Figure 29:
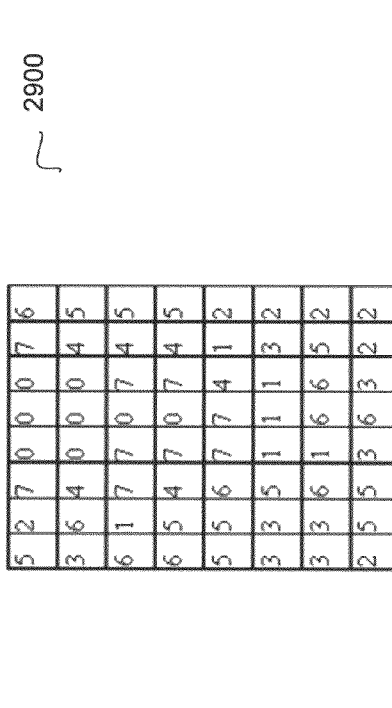
FIG. 29 shows a structure of palette based images, in accordance with embodiments of the disclosure.

The steganographic capacity is used to separate the image into embeddable regions within the image and non-embeddable areas. This is shown in FIG. 28 where the highlighted blocks may be considered embeddable areas and the natural spaces are non-embeddable regions. These designations will be used to embed secure information within the embeddable regions.

Palette Based Steganography

In this section, a necessary background for palette based images used for embedding digital content is presented. The capacity measure necessary for embedding is also described in this section.

Due to high redundancy within the image, true-color images have higher embedding capacities. However, palette-based images have been used as cover images to provide a secure and fast transmission/storage over a communication system. Due to their abundance within vast systems, it is difficult to find a suspicious stego-image. Furthermore, since there are alterations introduced by the color reduction and errors in storage, the steganographic message is able to pass as noise. Given that palette-based images have a smaller resolution, they can also be transmitted faster than 24-bit resolution images through a communication channel during archiving.

In order to solve the flaws of existing methods, a new capacity palette-based steganographic approach is presented. Two new practical steganographic including embeddable and non-embeddable capacities are provided. These methods randomly select pixels in the index of an embeddable region within an image and arrange it (using special sorting scheme) in such an order to provide the desired secret key. This method may replace a randomly selected pixel by the closest pixel in the color space that contains the desired parity bit. In addition, the new capacities palette based embedding may be used for 1) separation of a given image into embeddable and non-embeddable areas; 2) identification of the minimum and maximum embedding capacities of a cover digital image; 3) selecting the best cover image from a class of images; and 4) embedding only in selected colors of the palette. This offers the advantage that secures data can be embedded within the index, the palette, or both therefore, adding an extra level of security. This method embeds in the palette by applying sensitivity measure technique previously used for gray scale and color images. This technique is applied to full color images by decomposing the image into its three color layer components within the digital image and treating each layer as a gray scale image. Next, an embedding into one or more of the color components of each layer of the images may be performed. However, even if only one of the color component images is used for embedding, the number of colors in the palette after embedding may be over the maximum number allowed. In order to represent the image data using a proper palette-based format, color quantization may be applied. After information is embedded, it may be imperative that pixel values of the color component contains the embedded information, otherwise the secure data can be lost. Changes may be made to the pixel values of the other two color components within the images. It is assumed that the degrading of the color component image with information embedded is smaller than that of the color component images that are used for color reduction. The human visual system is more sensitive to changes in the luminance of a color. Since G has the largest contribution to luminance of the three color components, information is primarily embedded in this layer. One of the effects caused by this method is that the number of colors in the palette changes. In order to balance the palette to the original number of colors, the R and B components may be modified in a way that minimizes the square error.

Bit Plane Palette Based Stego Sensitivity Measure

This section describes basic methodology for applying the Bit Plane Stego Sensitivity Measure to palette-based images. In addition, we introduce a new improved steganographic method. Finally, some the most common flaw of these algorithms are discussed.

Recently, methods that embed in 24-bit images have been applied to palette-based 8-bit images. This is achieved by changing color models, for example by going from palette-based to RGB method, embedding and going back to the palette-based model. These methods exploit the fact that alterations may be introduced by the color quantization procedure during the transition of one color model to then next. Embedding may take place in these alteration paths or noisy areas. In this approach, a BPSC approach may be used to separate the noisy patterns from informational patterns. The idea is to embed only in noisy patterns leaving the informative areas intact, therefore introducing less noise while embedding. In addition images that embed using BPCS approach are harder to detect. In order to further enhance the quality of the stego image, the information may be embedded in a way that the color that is the most sensitive to changes is not affected. This algorithm however, can not be applied directly to a particular color in the palette-based image. Since the color vectors in a palette are form as a combination of the red, green and blue, the image has to be separated in to its color layers using the RGB color mode. After embedding we most go back to palette-based, this is achieved using color quantization.

The next step in this algorithm is to determine which color is the most sensitive to changes. In some respects, the color green was chosen since it has the most effect on the luminance and the human eye is more sensitive to changes in the luminance. The reason for selecting the most sensitive color layer for embedding is to preserve the luminance information. The information may subsequently be embedded in the noisy areas selected by the binary pattern complexity system.

In other embodiments, a new palette-based steganographic method with improved selective quality and embedding capacity is provided. In this algorithm, a Bit Plane Stego Sensitivity Measure (BPSSM) may be applied to one of the color components that resulted from switching to the RGB model. Next a layer for embedding is selected. It is noted that the best layer can vary depending on the image used. Using the BPSSM, embeddable regions from the selected layer may be extracted. Note, this algorithm may only embed on the selected areas of the best color layer.

The general algorithm for palette based steganography using complexity measures includes an input step for inputting an image of any size to be analyzed. Color values from the image may be obtained and a color layer for embedding may be selected. Embeddable regions using the bit plane stego sensitivity measure may be obtained and may be applied to the selected color layer. A new palette using the best color layer may be produce, while the other layers of the image remain intact. The embedded palette-based image may be outputted.

In most cases, after embedding, the number of color vectors exceeds 256 (0-255) colors. This may be a problem since the maximum color intensity in an 8-bit palette representation is 255. The usage color quantization may guarantee that the new palette will not exceed 256 colors. This process may be achieved without changing the selected color layer, since this is were the secret information lies. In order to begin the color reduction procedure, color vectors that share the same value of the selected color layer may be obtained to make a new table. Using this table, the new color vectors for red and blue may be computed. For example, if selected color layer is a green layer, three red and blue colors that share a green may be obtained and a mean value may be calculated. These values are denoted mean read (MR) and mean blue (MB). For improvement in the reduction method, the square errors to determine which combinations are the best are calculated.

Computer Simulations

Figure 30:
FIG. 30 includes the root mean square error (RMS) values obtained by comparing different clean images with their corresponding stego images while embedding 6 k of data.
Figure 30:
Figure 30:
Figure 30:
Figure 30:

In this section, the algorithm of the present disclosure is compared with the BPCS palette based algorithm. Tables 9 and 10 illustrate the differences by incrementing the embedded data. In FIG. 30, the maximum amount of data that it takes to load the image with secure data without causing visual changes was embedded. The same amount of information was embedded using BPCS method the embedded data causes statistical and visual changes within the image. The presented method's maximum capacity while embedding in the lower bit plane layers fluctuated between 9.4 k and 13.6 k while the BPCS method fluctuated between 5.4 k and 8.7 k.

TABLE 9

This table contains the RMS values obtained by comparing the clean and stego Sarkis images

| | Image-RMS | |
| --- | --- | --- |
| M | Presented Method | BPCS Method |
| 4k | 0.233 | 0.242 |
| 5k | 0.284 | 6.757 |
| 6k | 0.325 | 7.255 |
| 7k | 3.013 | 7.260 |
| 8k | 4.849 | 8.781 |
| 13k | 8.961 | 10.171 |

TABLE 10

This table contains RMS values obtained by comparing the clean and stego Golden Gate images.

| | Image-RMS | |
| --- | --- | --- |
| M | Presented | BPCS |
| 4k | 0.244 | 0.249 |
| 5k | 0.288 | 9.685 |
| 6k | 5.180 | 10.061 |
| 7k | 8.019 | 11.842 |
| 8k | 10.017 | 13.366 |
| 13k | 14.001 | 15.155 |

Figure 31:
FIG. 31 contains the root mean square error (RMS) values obtained by comparing different clean images with their corresponding stego images while embedding 6 k of data.
Figure 31:
Figure 31:
Figure 31:
Figure 31:
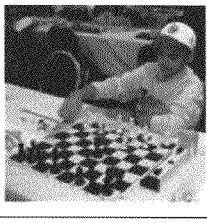

In this section, the presented algorithm (using both RGB and YCbCr color formats) was compared with the BPCS palette based algorithm by embedding in 256×256 images. Tables 11 and 12 illustrate the differences by incrementing the embedded data. In FIG. 31, a maximum amount of data that it takes to load the image with secure data without causing visual changes was embedded. The same amount of information using BPCS method was embedded and the embedded data causes more statistical and visual changes within the image than both presented methods (RGB and YCbCr). The presented method's maximum capacity while embedding in the lower bit plane layers fluctuated between 9.4 k and 13.6 k while the BPCS method fluctuated between 5.4 k and 8.7 k. The presented method for both RGB and YCbCr color models is better at identifying the noisy regions. The bit plane stego sensitivity measure adaptively selects the best embeddable block within the noisy regions. This is the reason why the presented method has outperformed the BPCS palette based steganography scheme.

TABLE 11

This table contains the RMS values obtained by comparing the clean and stego boy images.

| Size | Presented RGB | Presented YCbCr | BPCS RGB |
|---|---|---|---|
| 4k | 0.233 | 0.246 | 0.242 |
| 5k | 0.284 | 0.287 | 6.746 |
| 6k | 0.325 | 0.331 | 7.339 |
| 7k | 3.051 | 1.885 | 7.404 |
| 8k | 4.900 | 2.545 | 8.954 |
| 13k | 9.109 | 4.330 | 10.250 |

TABLE 12

This table contains RMS values obtained by comparing the clean and stego Rock image.

| Size | Presented RGB | Presented YCbCr | BPCS RGB |
|---|---|---|---|
| 4k | 0.236 | 0.249 | 0.245 |
| 5k | 0.284 | 0.303 | 6.577 |
| 6k | 0.335 | 0.339 | 7.596 |
| 7k | 5.884 | 2.625 | 7.800 |

TABLE 12-continued

This table contains RMS values obtained by comparing the clean and stego Rock image.

| Size | Presented RGB | Presented YCbCr | BPCS RGB |
|---|---|---|---|
| 8k | 6.767 | 2.769 | 8.480 |
| 13k | 8.613 | 4.061 | 10.394 |

The above section presented a new secure high capacity embedding method used with a secure multilayer database system for digital image archiving. This steganographic approach has shown the following advantages, including bit plane stego sensitivity measure for palette-based images provides a secure and fast transmission/storage over a communication system, offers additional security through a simple selective color and cover image algorithm, provides the closest color substitutes using a weighted distance measure, offers an increased capacity by embedding in N×M adaptive blocks sizes, the secure media storage system contains an independent steganographic method that provides an additional level of security, among other advantages. This method may be used to further enhance the steganographic algorithms utilized for digital image archiving purposes.

Security Considerations

In this section, security issues will be addressed using well know steganalysis techniques. The security of the presented methods was tested using 100 hundred palette-based images using the following methods: Chi-Square, Pairs Analysis, and RS Steganography. These images where embedded using the RGB and YCbCr color models. The analysis shows that the presented method is completely immune to the Chi Square and Pairs Analysis steganalysis methods. However, RS Steganalysis detected hidden information within the green layer of cover images that were embedded using the RGB color model (see Table 15). To improve the security of the presented method information was hidden using the luminance layer of the YCbCr color model to embed (see Table 16).

TABLE 13

This table contains the averages of the detection percentage results of 100 512 × 512 palette based images using Chi Square Steganalysis.

| | 0% | 1% | 3% | 6% | 12% | 23% | 40% | 76% | 95% |
|---|---|---|---|---|---|---|---|---|---|
| Average Stego Detected | 0.01% | 0.04% | 0.13% | 0.26% | 0.53% | 1.03% | 1.82% | 3.57% | 4.41% |

TABLE 14

This table contains the averages of the detection percentage results of 100 512 × 512 palette based images using Pairs Analysis.

| | 0% | 1% | 3% | 6% | 12% | 23% | 40% | 76% | 95% |
|---|---|---|---|---|---|---|---|---|---|
| Average Stego Detected | 1.85% | 3.11% | 2.96% | 5.17% | 5.38% | 4.24% | 4.02% | 7.66% | 9.60% |

TABLE 15

This table contains the averages of the detection percentage results of 100 512 × 512 palette based images using RS Steganalysis.

| Embedded | Detection Clean | | | Detection Cover Image | | | Differences | | |
|---|---|---|---|---|---|---|---|---|---|
| % | Red | Green | Blue | Red | Green | Blue | Red | Green | Blue |
| 1% | 2.93% | 2.68% | 2.74% | 2.93% | 2.94% | 2.74% | 0.00% | 0.26% | 0.00% |
| 3% | 2.93% | 2.68% | 2.74% | 2.93% | 3.41% | 2.74% | 0.00% | 0.74% | 0.00% |
| 6% | 2.93% | 2.68% | 2.74% | 2.93% | 4.43% | 2.74% | 0.00% | 1.75% | 0.00% |

TABLE 15-continued

This table contains the averages of the detection percentage results of 100 512 × 512 palette based images using RS Steganalysis.

| Embedded | Detection Clean | | | Detection Cover Image | | | Differences | | |
|---|---|---|---|---|---|---|---|---|---|
| % | Red | Green | Blue | Red | Green | Blue | Red | Green | Blue |
| 12% | 2.93% | 2.68% | 2.74% | 2.93% | 6.39% | 2.74% | 0.00% | 3.72% | 0.00% |
| 23% | 2.93% | 2.68% | 2.74% | 2.93% | 11.25% | 2.74% | 0.00% | 8.57% | 0.00% |
| 40% | 2.93% | 2.68% | 2.74% | 2.93% | 18.59% | 2.74% | 0.00% | 15.92% | 0.00% |
| 76% | 2.93% | 2.68% | 2.74% | 4.08% | 36.70% | 2.87% | 1.15% | 34.03% | 0.13% |
| 95% | 2.93% | 2.68% | 2.74% | 3.41% | 42.51% | 3.04% | 0.49% | 39.83% | 0.30% |

This images where embedded in the RGB color model.

TABLE 16

This table contains the averages of the detection percentage results of 100 512 × 512 palette based images using RS Steganalysis.

| Embedded | Detection Clean | | | Detection Cover Image | | | Differences | | |
|---|---|---|---|---|---|---|---|---|---|
| % | Red | Green | Blue | Red | Green | Blue | Red | Green | Blue |
| 1% | 2.93% | 2.68% | 2.74% | 4.00% | 3.58% | 4.95% | 1.08% | 0.91% | 2.21% |
| 3% | 2.93% | 2.68% | 2.74% | 4.03% | 3.53% | 4.91% | 1.10% | 0.85% | 2.18% |
| 6% | 2.93% | 2.68% | 2.74% | 4.05% | 3.41% | 4.77% | 1.13% | 0.74% | 2.03% |
| 12% | 2.93% | 2.68% | 2.74% | 3.95% | 3.24% | 4.59% | 1.03% | 0.57% | 1.85% |
| 23% | 2.93% | 2.68% | 2.74% | 3.98% | 3.24% | 4.34% | 1.05% | 0.57% | 1.60% |
| 40% | 2.93% | 2.68% | 2.74% | 3.60% | 3.03% | 4.18% | 0.67% | 0.35% | 1.44% |
| 76% | 2.93% | 2.68% | 2.74% | 3.58% | 3.74% | 4.13% | 0.66% | 1.07% | 1.39% |
| 95% | 2.93% | 2.68% | 2.74% | 4.09% | 6.41% | 3.79% | 1.16% | 3.74% | 1.05% |

This images where embedded in the YCbCr color model.

In this disclosure, a new, secure, high capacity embedding method capable of embedding in multiple bit-planes using different color model is provided. This steganographic approach has shown the following advantages: 1) bit plane stego sensitivity measure for palette-based images provides a secure and fast transmission/storage over a communication system; 2) Offers additional security through a simple selective color and cover image algorithm; 3) Offers an increased capacity by embedding in N×M adaptive blocks sizes; 4) Offers the option of working with different color models; and 5) secure media storage system contains an independent steganographic method that provides an additional level of security. This method can be used to further enhance the steganographic algorithms utilized for secure digital image transmission.

The methods of the present disclosure may be performed using executable instructions. For example, a computer code for implementing all or parts of this disclosure may be used. The code may be housed on any computer capable of reading such code as known in the art. For example, it may be housed on a computer file, a software package, a hard drive, a FLASH device, a USB device, a floppy disk, a tape, a CD-ROM, a DVD, a hole-punched card, an instrument, an ASIC, firmware, a "plug-in" for other software, web-based applications, RAM, ROM, etc. The computer code may be executable on any processor, e.g., any computing device capable of executing instructions for traversing a media stream. In one embodiment, the processor is a personal computer (e.g., a desktop or laptop computer operated by a user). In another embodiment, processor may be a personal digital assistant (PDA) or other handheld computing devices.

In some embodiments, the processor may be a networked device and may constitute a terminal device running software from a remote server, wired or wirelessly. Input from a source or other system components may be gathered through one or more known techniques such as a keyboard and/or mouse. Output, if necessary, may be achieved through one or more known techniques such as an output file, printer, facsimile, e-mail, web-posting, or the like. Storage may be achieved internally and/or externally and may include, for example, a hard drive, CD drive, DVD drive, tape drive, floppy drive, network drive, flash, or the like. The processor may use any type of monitor or screen known in the art, for displaying information. For example, a cathode ray tube (CRT) or liquid crystal display (LCD) can be used. One or more display panels may also constitute a display. In other embodiments, a traditional display may not be required, and the processor may operate through appropriate voice and/or key commands.

With the benefit of the present disclosure, those having ordinary skill in the art will comprehend that techniques claimed here may be modified and applied to a number of additional, different applications, achieving the same or a similar result. The claims cover all such modifications that fall within the scope and spirit of this disclosure.

What is claimed is:

1. A method comprising:
   providing secure data;
   providing a host image;
   decomposing the host image into a plurality of images;
   selecting from plurality of images portions of the decomposed host image to embed the secure data; and
   decomposing any non-binary secure data into a binary format to compress the secure data by generating a pseudo noise sequence from a pseudo noise generator using a key; and
   embedding the secure data.

2. The method of claim 1, where decomposing comprises decomposing the host image into a plurality of layers.

3. The method of claim 2, where the plurality of layers comprises a plurality of color layers.

4. The method of claim 3, where decomposing the host image comprises converting the host image into several layers using a color model.

5. The method of claim 4, the color model comprising a RGB (red, green, blue) model, a YCbCr (luminance, chrominance blue, chrominance red) model, a YIQ (luminance, intensity, chrominance) model, a HSV (hue, saturation, value) model, a CMY (cyan, magenta, yellow) model, or a CMYK (cyan, magenta, yellow, black) model.

6. The method of claim 2, where selecting portions of the host image comprises selecting a layer from the plurality of layers of the host image to embed the secure data.

7. The method of claim 6, further comprising categorizing the selected layer of the host image.

8. The method of claim 2, wherein the plurality of layers comprises a plurality of least significant bit layers.

9. The method of claim 8, further comprising selecting one of least significant bit layers from the plurality of least significant bit layers.

10. The method of claim 9, further comprising modifying the selected least significant bit layer.

11. The method of claim 1, further comprising generating a pseudo-noise sequence for encrypting the binary format.

12. A computer program stored on a non-transitory computer readable medium, comprising computer or machine-readable program elements translatable for implementing the method of claim 1.

13. A method comprising:
providing secure data;
providing a host image;
decomposing the host image into a plurality of layers using a color model;
selecting portions of the host image comprises selecting a layer from the plurality of layers of the host image to embed the secure data in response to at least one feature of the secure data to be embedded into the selected layer;
decomposing any non-binary secure data into a binary format to compress the secure data by generating a pseudo noise sequence from a pseudo noise generator using a key; and
embedding the secure data.

14. The method of claim 13, wherein selecting the portions of the host image comprises determining which layer is most sensitive to changes.

15. The method of claim 13, wherein selecting the portions of the host image comprises selecting a layer having a greatest susceptibility to a change in luminance when the secure date is embedded.

16. A method comprising:
providing secure data;
providing a host image;
decomposing the host image into a plurality of images;
selecting portions of the decomposed host image to embed the secure data;
decomposing any non-binary secure data into a binary format to compress the secure data by generating a pseudo noise sequence from a pseudo noise generator using a key; and
embedding the secure data using an adaptive steganography process such that any changes in the image statistics and visual features of the host image caused by embedding the secure date are not readily perceivable.

17. A method comprising:
providing secure data;
providing a host image;
decomposing the host image into a plurality of images;
selecting portions of the decomposed host image to embed the secure data such that the layer in which the secure data is embedded will be impervious to attack;
decomposing any non-binary secure data into a binary format to compress the secure data by generating a pseudo noise sequence from a pseudo noise generator using a key; and
embedding the secure data.

18. A method comprising:
providing secure data, wherein the secure data comprises random data;
providing a host image;
decomposing the host image into a plurality of images;
selecting portions of the decomposed host image to embed the secure data;
decomposing any non-binary secure data into a binary format to compress the secure data by generating a pseudo noise sequence from a pseudo noise generator using a key; and
embedding the secure data into the selected portions of the decomposed host image.

19. A method comprising:
providing secure data, wherein the secure data comprises random/noise data;
generating a random representation system; representing a random data by the random representation system; providing a host image;
decomposing the host image into a plurality of images;
selecting portions of the decomposed host image to embed the random represented secure data;
decomposing any non-binary secure data into a binary format to compress the secure data by generating a pseudo noise sequence from a pseudo noise generator using a key; and
embedding the random represented secure data into the selected portions of the decomposed host image.

20. The method of claim 19, wherein the random representation system comprises a pseudorandom data stream.

21. The method of claim 20, wherein representing the random data further comprises compressing the random data using the pseudorandom data stream.

* * * * *